United States Patent Office 3,014,952
Patented Dec. 26, 1961

3,014,952
ORGANIC COMPOUNDS OF BORON AND PHOSPHORUS
Gail H. Birum and James L. Dever, Dayton, Ohio, assignors to Monsanto Chemical Company, St. Louis, Mo., a corporation of Delaware
No Drawing. Filed Mar. 20, 1959, Ser. No. 800,656
18 Claims. (Cl. 260—461)

The present invention relates to organic compounds containing both boron and phosphorus, and more particularly provides phosphorus-containing esters of boron acids, the method of preparing the same, hydrocarbon fuels containing the new esters, and methods of inhibiting the preignition of leaded fuels in which method the esters are employed.

According to the invention, phosphinyl esters of boron acids are prepared by the reaction of a boron compound having a halogen atom selected from the class consisting of chlorine and bromine linked to the boron atom thereof, a carbonyl compound, and an alkyl or haloalkyl phosphite, phosphonite or phosphinite. The reaction proceeds, for example, according to the scheme:

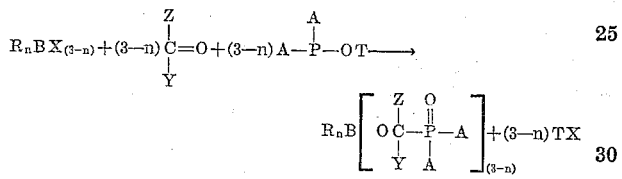

wherein R is selected from the class consisting of hydrocarbyl-, halohydrocarbyl-, hydrocarbyloxy-, halohydrocarbyloxy-, hydrocarbylthio-, and halohydrocarbylthio- radicals wherein the hydrocarbyl group has from 1 to 12 carbon atoms; (alkyl)$_2$N-radicals having from 1 to 5 carbon atoms in each alkyl group;

radicals wherein D represents the necessary atoms to complete a saturated N-hetero ring of from 2 to 5 carbon atoms; and wherein two R's taken together stand for a bivalent —O—alkylene—O— radical having from 2 to 4 carbon atoms in the alkylene chain and a total of from 2 to 12 carbon atoms; $n$ is an integer of 0 to 2; X is selected from the class consisting of chlorine and bromine; Y is selected from the class consisting of hydrogen and alkyl radicals of from 1 to 12 carbon atoms when $n$ is zero; and when $n$ is 1 to 2, Y is selected from the class consisting of hydrogen and the radicals: alkyl of from 1 to 12 carbon atoms, furyl, thienyl and benzenoid hydrocarbon which are free of aliphatic unsaturation and contain from 6 to 12 carbon atoms; and said radicals carrying a substituent selected from the class consisting of halogen, cyano, methylenedioxy, alkyl, —O—alkyl and —COOalkyl where the alkyl radical has from 1 to 5 carbon atoms; Z is selected from the class consisting of hydrogen and alkyl radicals of from 1 to 3 carbon atoms and is alkyl only when $n$ is from 1 to 2 and Z and Y taken together complete a cycloalkane ring having from 5 to 6 carbon atoms in the ring and a total of from 5 to 10 carbon atoms; T is selected from the class consisting of alkyl and haloalkyl radicals of from 1 to 12 carbon atoms; and each A is selected from the class consisting of —OT and hydrocarbyl radicals which are free of aliphatic unsaturation and contain from 1 to 12 carbon atoms.

The number of phosphinyl radicals present in the presently provided compounds thus depends upon the number of halogen atoms present in the halogen-containing boron compound which is used in the reaction. When only one halogen atom is present, the reaction proceeds as follows:

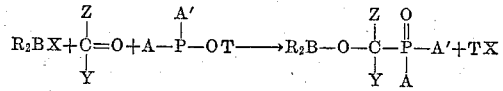

When two halogens are present, the reaction is:

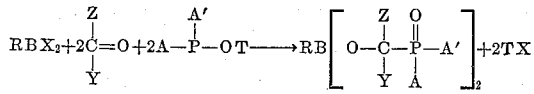

When three halogen atoms are present, the reaction is

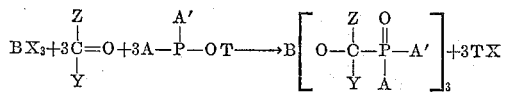

Presently useful boron compounds having halogen linked to the boron atom thereof are compounds of the formula

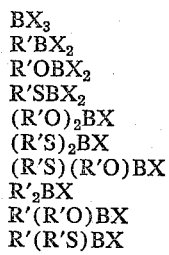

wherein R' is a hydrocarbyl radical of from 1 to 12 carbon atoms or said hydrocarbyl radical containing halogen substitution and X is chlorine or bromine. Also presently useful are the compounds

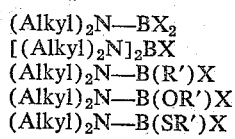

wherein the alkyl radical has from 1 to 5 carbon atoms and R' is as above defined.

Also presently useful are the heterocyclic compounds of the formula

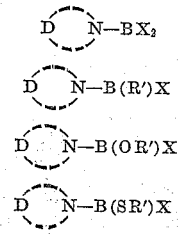

where

denotes a saturated N-heterocyclic radical or from 2 to 5 carbon atoms and R' is as above defined.

Particularly useful are the cyclic partial esters of the formula

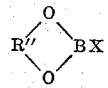

wherein R" is a bivalent alkylene radical having from 2 to 4 carbon atoms in the alkylene chain and a total of from 2 to 12 carbon atoms.

Examples of boron-halogen compounds insofar as BX$_3$ is concerned are boron trichloride, boron tribromide and the mixed boron bromide chlorides.

Compounds of the formula R'OBX$_2$ wherein R' and X are as defined above are dichlorohydrocarbyloxyboranes, dibromohydrocarbyloxyboranes or bromochlorohydrocarbyloxyboranes. The hydrocarbyl radical may be alkyl, alkenyl, alkynyl, cycloalkyl, aryl, alkaryl, or aralkyl and such hydrocarbyl radicals may be substituted by one or more atoms of halogen. Examples of the presently useful dichloro-, dibromo-, or bromochloroalkoxyboranes, -alkenyloxyboranes, or -alkynyloxyboranes are dichloromethoxyborane, dichloroethoxyborane, dichloroisopropoxyborane, dichloroallyloxyborane, dichloro-n-butoxyborane, dichloro-2-butenyloxyborane, dichloropentyloxyborane, dichlorohexyloxyborane, dichloroheptyloxyborane, dichloro-2-pentynyloxyborane, dichloro-2-ethylhexyloxyborane, dichloro-tert-nonyloxyborane, dichloro-2 - propynyloxyborane, dichloroundecyloxyborane, dichlorododecyloxyborane, dibromoethoxyborane, dibromo-3-decenyloxyborane, dibromobutoxyborane, dibromohexyloxyborane, dibromo-2-ethylhexyloxyborane, dibromodecyloxyborane, dibromododecyloxyborane, bromochloromethoxyborane, bromochloropropoxyborane, bromochloropentyloxyborane, bromochlorooctyloxyborane, bromochlorododecyloxyborane, etc.

Examples of the presently useful dihaloalkoxyboranes, dihaloalkenyloxyboranes or dihaloalkynyloxyboranes having halogen substitution in the alkoxy, alkenyloxy or alkynyloxy radical are dichloro(2-chloroethoxy)borane, dibromo(2-chloroallyloxy)borane, dichloro(2-chloropropoxy)borane, dibromo(tribromobutoxy)borane, chlorobromo(2-chloro-5 - hexynyl)borane, dichloro(3 - fluoropropoxy)borane, dichloro(2-chloro - 4 - pentenyloxy)borane, dichloro(2-iodopropoxy)borane, dichloro(chlorododecyloxy)borane, etc.

Examples of the presently useful cycloalkoxy or halocycloalkoxy dihaloboranes are dichlorocyclohexyloxyborane, dichlorocyclopentyloxyborane, dibromo-2-methylcyclopentyloxyborane, dichloro - 4 - isopropylcyclohexyloxyborane, dichloro-2,4 - dichlorocyclopentyloxyborane, dibromo-3-propen-2 - ylcyclohexyloxyborane, dibromo-2-fluorocyclopentyloxyborane, dichloro-2-iodo-4-methylcyclohexyloxyborane, etc.

Examples of the benzenoid dihaloboranes are dichlorophenoxyborane, dichloro-α- or β-naphthyloxyborane, dichloro-4-biphenylyloxyborane, dibromo-4-ethylphenoxyborane, dichlorobenzyloxyborane, dibromo-2-phenylethoxyborane, bromochloro-4-isopropylbenzyloxyborane, dichloro-4-penten-2-ylbenzyloxyborane, dichloro-α-napthylmethoxyborane, dichloro-4-tolyloxyborane, etc.

Compounds of the formula R'SBX$_2$ wherein R' and X are as defined above, are dihalohydrocarbylthioboranes. Such compounds are, e.g., dichloromethylthioborane, dibromoethylthioborane, dichloro-n-propylthioborane, dichloro-5-hexenylthioborane, bromochlorobutylthioborane, dichloro-2 - ethylhexythioborane, dichlorocyclohexylthioborane, dichloro-2 - propynylthioborane, dibromocyclopentylthioborane, dichloro - 2 - methylcyclopentylthioborane, dichloro(2-chloroethylthio)borane, dichloro(3-iodopropylthio)borane, dibromo(3,3 - dibromopropylthio)borane, dichloro(2 - fluoroethylthio)borane, dichloro(trichlorooctylthio)borane, dibromo(bromododecylthio)borane, dichloro(2-chlorocyclohexylthio)borane, dichlorophenylthioborane, dichlorobenzylthioborane, dibromo-α-naphthylthioborane, dichloro-2-vinylphenylthioborane, dichloro-4-biphenylylthioborane, dichloro(4-chlorophenylthio)borane, dichloro(pentachlorophenylthio)borane, dibromo(α-bromonaphthylthio)borane, dichloro[4 - (trifluoromethyl)phenylthio]borane, bromochloro(4-chlorobenzylthio)borane, dibromo(4-iodophenylthio)borane, dichloro(octachlorobiphenylylthio)borane, etc.

Presently useful compounds of the formula (R'O)$_2$BX wherein R' and X are as defined above, are halodihydrocarbyloxyboranes or halobis(halohydrocarbyloxy)boranes, e.g., chlorodiethoxyborane, chlorodipropoxyborane, chlorodi-2-propenyloxyborane, chlorodi-n-butoxyborane, chlorobis(2 - ethylhexyloxy)borane, bromodidecyloxyborane, rane, chlorodidodecyloxyborane, chlorodi-4-pentynyloxyborane, cholorobis(2-chloroethoxy)borane, chlorobis(2-chloropropoxy)borane, bromobis(tetrachlorooctyloxy)borane, chlorodiphenoxyborane, chlorobis(2,4-dichlorophenoxy)borane, bromobis(2-fluoroethoxy)borane, chlorodibenzyloxyborane, chlorobenzyloxybutoxyborane, chlorobis(phenylethoxy)borane, bromobis(2,4-dichlorophenoxy)borane, chlorodicyclohexyloxyborane, chloro(2,4-dichlorocyclopentyloxy)borane, etc.

Also useful for the present purpose are halobis(hydrocarbylthio)boranes, e.g., compounds of the formula (R'S)$_2$BX wherein R' and X are as defined above. Examples of such compounds are, e.g., chlorobis(methylthio)borane, chlorobis(ethylthio)borane, chlorobis(2-butenylthio)borane, bromobis(butylthio)borane, chlorobis(n-octylthio)borane, chlorobis(2-pentynylthio)borane, chlorobis(dodecylthio)borane, cholorbis(phenylthio)borane, bis(benzylthio)chloroborane, bis(4-butylphenylthio)chloroborane, chlorobis(naphthylthio)borane, chloro(phenylthio)(propylthio)borane, chlorobis(2 - chloroethylthio)borane, chlorobis(cyclohexylthio)borane, etc.

Also provided by the invention are halohydrocarbyloxy(hydrocarbylthio)boranes, i.e., compounds of the formula

wherein R' and X are as above described. Such compounds are, for example, chloroethoxy(methylthio)borane, chlorobutoxy-propylthio)borane, bromopentenyloxy(phenythio)borane, chloronaphthyloxy-p-tolylthio)borane, chlorohexynyloxy(pentylthio)borane, chloro(2 - chloroethoxy)(biphenylylthio)borane, chloro(pentachlorophenylthio)ethylborane, etc.

A very valuable class of the presently useful halides includes the halodihydrocarbylboranes, i.e., compounds of the formula R'$_2$BX in which R' and X are as above defined. Such compounds are chlorodiethylborane, chlorodipropylborane, chlorodi-2-butenylborane, chlorodidodecylborane, chlorodi-2-propynylborane, bromobis(2-ethylhexyl)borane, chlorodiphenylborane, chlorobis(β-chlorovinyl)borane, chlorodi-α-naphthylborane, bromo-α-naphthylphenylborane, chloroethylphenylborane, bromo(4-bromophenyl)-β-naphthylborane, chlorodi-p-tolylborane, chloro(bischloroethyl)borane, chlorodicyclohexylborane, chlorocyclopentylphenylborane, etc.

Also useful in the reaction with carbonyl compounds and phosphite, phosphonites, or phosphinites are the halohydrocarbylhydrocarbyloxyboranes, i.e., compounds of the formula

and

wherein R' and X are as above defined. Examples of such compounds are chloromethylmethoxyborane, chloroethylphenoxyborane, chloro(2-chloroethyl)ethoxyborane, chloro-4-pentynylethoxyborane, bromopentyldodecyloxyborane, chloro - β - naphthyl - β-naphthyloxyborane, biphenylylchlorophenyloxyborane, chlorodecylpropoxyborane, chlorocycloalkylbutoxyborane, chlorocyclopentylcyclopentyloxyborane, chlorobenzyl - p - tolyloxyborane, chloro(phenylethyl)benzyloxyborane, chloroethyl(ethylthio)borane, chloro-2-butenyl(phenylthio)borane, chloro-n-octyl(dodecylthio)borane, bromobutyl(cyclohexylthio)borane, bromoheptyl(β-naphthylthio)borane, chlorobenzyl(benzylthio)borane, chlorophenyl(2,4-dichlorophenylthio)borane, chloro(2 - chloroethyl)-11-dodecenyloxyborane, chloro(2 - chloroethyl)(2 - chloroethylthio)borane, chlorophenyl(2-chloropropylthio)borane, chloro(2-fluoropropyl)(phenylthio)borane, etc.

A further class of presently useful halogen-containing boron compounds comprises the dihalohydrocarbylboranes, i.e., compounds of the formula R'BX₂ wherein R' is a hydrocarbyl or halohydrocarbyl radical of from 1 to 12 carbon atoms and X is chlorine or bromine. Examples of such compounds are the aromatic compounds such as dichlorophenylborane, dichloro-α- or β-naphthylborane,- dichloro(2-, 3- or 4-chlorophenyl)borane, di bromo(4 - ethylphenyl)borane, dichloro - 4-propen-2-yl-phenylborane, and dichloro-p-tolylborane; the aliphatic dihalohydrocarbylboranes such as dichloromethylborane, dichloroethylborane, dichloro-5-hexenylborane, dichloro-(2-chloroethyl)borane, dichloro(2-chloropropyl-borane, dibromo - 2 - propynylborane, dibromo(tribrobutyl)borane, dichloro(2-ethylhexyl)borane, dichloro(chlorodecenyl)borane, dichlorododecylborane and bromochloropentylborane; the alicyclic compounds such as dichlorocyclohexylborane or dichloro-2-methylcyclopentylborane, etc.

Also presently useful are dihalodialkylaminoboranes, i.e., compounds of the formula (alkyl)₂N-BX₂ wherein the alkyl radical has from 1 to 5 carbon atoms. Examples of such compounds are dichlorodimethylaminoborane, dichlorodiethylaminoborane, dichlorodi - n - butylaminoborane, dichloroethylpropylaminoborane, bromochlorodi-butylaminoborane, dichlorodipentylaminoborane and dichloroethylmethylaminoborane.

Still another class of presently useful halogenated boron compounds includes the N-heterocyclicdihaloboranes, e.g., compounds of the formula

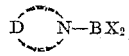

in which

denotes a saturated N-heterocyclic radical of from 2 to 5 carbon atoms and X is as defined above. This includes dichloromorpholinoborane, dichloroaziridinoborane, and dichloropiperidinoborane, i.e., compounds of the formula

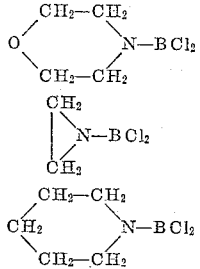

The corresponding dibromides are similarly useful.

Also useful are the mono-halohydrocarbyldialkyl-aminoboranes and the mono-halohydrocarbyl-N-heterocyclicboranes, i.e., compounds of the formula

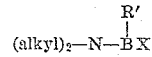

and

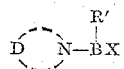

e.g., compounds such as chloroethyldiethylaminoborane, chlorophenyldipropylaminoborane, chloroethylmorpholinoborane, chlorophenylpiperidinoborane and aziridinochloromethylborane.

Also useful are the halodialkylaminohydrocarbyloxyboranes and the corresponding thio compounds, i.e., compounds of the formula

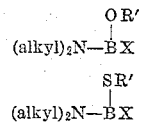

in which R' and X are as herein defined. Of these, chlorodiethylaminopropoxyborane, butoxychlorodimeth-ylaminoborane, bromodibutylaminophenoxyborane, benzyloxychlorodipentylaminoborane, chlorodimethylamino-(phenylthio)borane and chloro(chlorododecylthio)diethylaminoborane are illustrative.

Of pronounced utility in the presently provided process are halogenated ring compounds of borane. Such compounds have the formula

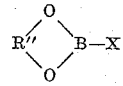

where R'' is a bivalent alkylene radical having from 2 to 4 carbon atoms in the alkylene chain and a total of from 2 to 12 carbon atoms. This includes the 2-chloro-1,3,2-dioxaborolanes, the 2-chloro-1,3,2-dioxaborinanes and the 2-chloro-1,3,2-dioxaborepanes as well as the corresponding 2-bromo compounds and alkyl derivatives of either the bromo or chloro compounds, e.g., 2-chloro-5,5-diethyl-1,3,2-dioxaborinane, 2-chloro-4,4,6-trimethyl-1,3,2-dioxaborinane, 2-chloro-5-methyl-5-ethyl-1,3,2-dioxaborinane, 2-chloro 4-n-octyl-1,3,2-dioxaborinane, 2-chloro-4,4,5,5-tetramethyl-1,3,2-dioxaborolane, 2 - chloro - 5,5-dibutyl-1,3,2-dioxaborolane, 2-chloro-5,5-dimethyl - 1,3,2 - dioxaborinane, 2 - chloro-4-pentyl-5,5-dibutyl-1,3,2-dioxaborolane, 2-chloro-4,7-dimethyl-1,3,2-dioxaborepane, 2-chloro-5,5-dimethyl-6,6-dimethyl-1,3,2-dioxaborepane, 2-chloro-5,6-di-n-butyl-1,3,2-dioxaborepane and 2-chloro-4-butyl-7-isopropyl-1,3,2-dioxaborepane.

Any of the above described halogen-containing boron compounds can be reacted with a carbonylic compound and a triorgano phosphite, phosphonite or phosphinite to give the phosphinyl esters of boron acids. Useful carbonylic compounds are, generally, aldehydes of from 1 to 13 carbon atoms and ketones of from 3 to 14 carbon atoms. However, in some instances the aldehydes appear to participate in the reaction more readily than the ketones. The presently useful aldehydes have the formula YCHO in which Y is selected from the class consisting of hydrogen and alkyl radicals of from 1 to 12 carbon atoms when $n$ is zero and when $n$ is 1 to 2, Y is selected from the class consisting of hydrogen and the radicals: alkyl of from 1 to 12 carbon atoms, furyl, thienyl and benzenoid hydrocarbon which are free of aliphatic unsaturation and contain from 6 to 12 carbon atoms and said radicals carrying a substituent selected from the class consisting of halogen, cyano, methylenedioxy, alkyl, —O-alkyl and —COOalkyl where the alkyl radical has from 1 to 5 carbon atoms. Owing to their easy availability, a particularly useful class of aldehydes includes the fatty aldehydes of from 1 to 12 carbon atoms, e.g., formaldehyde, acetaldehyde, propionaldehyde, butyraldehyde, isobutyraldehyde, valeraldehyde, isovaleraldehyde, hexanal, heptanal, 2-ethylhexanal, octanal, 2-butyloctanal, 6-methylheptanal, decanal, undecanal, 2-methylundecanal, lauraldehyde, etc.

The presence of halogen, cyano, methylenedioxy, alkyl, carboalkoxy and alkoxy substituents in the fatty aldehyde has no effect on the course of the reaction; hence, there may be employed such substituted fatty aldehydes as 3-cyanopropionaldehyde, chloroacetaldehyde, 3 - butoxybutyraldehyde, 4-cyano-2,2-dimethylbutyraldehyde, 2-ethoxybutyraldehyde, 2,3-dichloropropionaldehyde, 3-isopropoxypropionaldehyde, 2-methyl-2-fluoropropionaldehyde, dichlorolauraldehyde, ethyl 11-formylundecanoate, succinaldehydic acid methyl ester, ethyl 4-formylbutyrate, iodoacetaldehyde, dichloroacetaldehyde, etc.

The presently useful benzenoid aldehydes may be aliphatic-aromatic or purely aromatic aldehydes which may or may not be further substituted, e.g., benzaldehyde, o, m or p-tolualdehyde, phenylacetaldehyde, 1- or 2-naphthaldehyde, biphenyl-4-carboxaldehyde, hydrocinnamaldehyde, 2,3-dichlorobenzaldehyde, piperonal, 2-, 3- or 4-butoxybenzaldehyde, p-(ethoxy)benzaldehyde, 3,4-dipropoxybenzaldehyde, o, m or p-iodobenzaldehyde, 3,4- or 3,5-dibromobenzaldehyde, 5-tert-butyl-4-chloro-m-tolualdehyde, 5-tert-butyl-3-ethoxy-o-tolualdehyde, 2-p-cymenecarboxaldehyde, 1,8-dichloro-2-naphthaldehyde, 6-methoxy-2-naphthaldehyde, 2-cyano-1-naphthaldehyde, 4'-chloro - 4-biphenylcarboxaldehyde, 6-methoxy-3-biphenylcarboxaldehyde, etc.

The presently useful aldehyde may also be a heterocyclic aldehyde such as 2-, or 3-furaldehyde, 5-bromo or chloro-2-furaldehyde, 5-iodo-2-furaldehyde, 5-methyl-2-furaldehyde, 2- or 3-thiophenecarboxaldehyde, 5-tert-butyl - 2 - thiophenecarboxaldehyde, 3,5 - dimethyl-2-thiophenecarboxaldehyde, 4 - ethoxy-2-thiophenecarboxaldehyde, 2,5 - dichloro-3-thiophenecarboxaldehyde, 2,5-diethyl-3-thiophenecarboxaldehyde, etc.

Ketones, generally, are not so reactive as the aldehydes with the triorgano phosphite, phosphonite or phosphinite and the boron-halogen compound. While virtually any aldehyde reacts with said phosphite and a mono- or dihalo boron compound to give the presently provided phosphinyl boron esters, only a comparatively narrow class of ketones undergo the reaction. Useful dialkyl ketones are those having from 1 to 3 carbon atoms in one alkyl radical and from 1 to 11 carbon atoms in the other radical, e.g., acetone, diethyl ketone, ethyl methyl ketone, di-n-propyl ketone, isopropyl methyl ketone, ethyl n-propyl ketone, methyl n-octyl ketone, n-dodecyl ethyl ketone, 2-ethylhexyl propyl ketone, etc.

The presently useful ketones may also be alkyl benzenoid ketones wherein the alkyl group has from 1 to 3 carbon atoms and the benezenoid radical has from 1 to 12 carbon atoms, e.g., acetophenone, propiophenone, butyrophenone, benzyl methyl ketone, α-acetonaphthone, β-propionapthone, α-butyronaphthone, 4-chloroacetophenone, 4-ethyl acetophenone, 2,4-dimethyl acetophenone, 2-n-hexyl acetophenone, biphenylyl methyl ketone, etc.

The presently useful carbonylic compound may also be a cycloaliphatic ring monoketone having from 5 to 6 carbon atoms in the ring and a total of from 5 to 10 carbon atoms, e.g., cyclopentanone, cyclohexanone, 4-ethylcyclohexanone, 2,3-diethylcyclohexanone, 2-pentylcyclopentanone, etc.

Triorgano phosphites which are generally useful with the carbonylic compound and the halogen-containing compound of boron, according to the invention, are either simple or mixed phosphites. Examples of useful phosphites are trimethyl, triethyl, triisopropyl, tri-n-propyl, tri-n-butyl, tri-tert-amyl, tri-n-hexyl, tri-n-heptyl, tri(2-ethylhexyl), tri-n-octyl, trinonyl, tridecyl, triundecyl, tri-tert-dodecyl, amyl diethyl, butyl di-n-propyl, n-dodecyl dimethyl, ethyl octyl propyl, tris(2-chloroethyl), tris(3-chloropropyl), tris(2-chloropropyl), tris(3,4-dichlorobutyl), tris(2-bromoethyl), tris(3-iodopropyl), tris(2-fluoroethyl), tris(dichlorododecyl), 2-chloroethyl diethyl, 3-bromopropyl bis(2-chloroethyl), diamyl trichlorooctyl, 2-chloroethyl 3-chloropropyl 3-chlorobutyl, 2-chloroethyl methyl propyl, tris(2,3-dichloropropyl) or tris(2-bromo-3-chloropropyl) phosphite.

Phosphonites which are useful for the present purpose are dialkyl or bis(haloalkyl) or alkyl haloalkyl hydrocarbylphosphonites of the formula $$A-P(OT)_2$$

wherein A is a hydrocarbyl radical which has from 1 to 12 carbon atoms and is free of aliphatic unsaturation and T is selected from the class consisting of alkyl and haloalkyl radicals of from 1 to 12 carbon atoms. Presently useful phosphonites may be, e.g., esters of alkylphosphonous acids, e.g., diethyl ethylphosphonite, dimethyl butylphosphonite, dihexyl methylphosphonite, didodecyl pentylphosphonite, bis(2-chloroethyl) dodecylphosphonite, bis(2-chloropropyl) propylphosphonite, or bis(trichlorodecyl) isopropylphosphonite; esters of aromatic phosphonites such as diethyl phenylphosphonite, bis(2-ethylhexyl) 4-tolylphosphonite, didodecyl 2-phenylethylphosphonite, bis(2-chloroethyl)α-naphthylphosphonite or bis(tetrachlorobutyl) biphenylylphosphonite; esters of ali-cyclic phosphonites such as dimethyl cyclohexylphosphonite, dibutyl cyclopentylphosphonite, didecyl 2-methylcyclopentylphosphonite or bis(2-chloropropyl) benzylphosphonite.

Also useful for the present purpose are esters of phosphinous acid, i.e., esters of the formula $$A_2P-OT$$

wherein A is a hydrocarbyl radical having from 1 to 12 carbon atoms and being free of aliphatic unsaturation and T is selected from the class consisting of alkyl and haloalkyl radicals of from 1 to 12 carbon atoms. The useful phosphinites may be aliphatic, aliphatic-aromatic, aromatic or cycloaliphatic, e.g., methyl diphenylphosphinite, butyl diethylphosphinite, 2-chloroethyl di-α-naphthylphosphinite, dodecyl di-n-octylphosphinite, 2-chloropropyl dimethylphosphinite, 2-ethylhexyl bis(2-ethylhexyl)phosphinite, ethyl bis(2-methylcyclopentyl)phosphinite, methyl dibenzylphosphinite, etc.

When the aldehyde employed with the boron trichloride or boron tribromide and the triorgano phosphite is formaldehyde, products prepared according to the present process are either tris[(dialkoxyphosphinyl)methyl] or tris{[bis(haloalkoxy)phosphinyl]methyl}borates, depending upon whether a trialkyl phosphite or a tris(haloalkyl) phosphite is employed. Thus, reaction of boron trichloride, formaldehyde and trimethyl phosphite gives tris[(dimethoxyphosphinyl)methyl]borate; and reaction of boron trichloride, formaldehyde and tris(2-chloroethyl) phosphite gives tris{[bis(haloalkoxy)phosphinyl]methyl} borate.

Alkanecarboxaldehydes with boron trichloride and a trialkyl phosphite yield tris[1-(dialkoxyphosphinyl)alkyl] borates, i.e., compounds of the formula

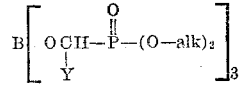

where Y and alk denote an alkyl radical of from 1 to 12 carbon atoms. Thus, reaction of boron trichloride with acetaldehyde and tri-n-butyl phosphite gives tris[1-(di-n-butoxyphosphinyl)ethyl]borate, i.e., a compound of the above formula in which Y is methyl and alk is n-butyl. Other compounds of the above formula which are prepared according to the present process are, e.g., Tris[1-(dimethoxyphosphinyl)ethyl]borate
Tris[1-(dimethoxyphosphinyl)undecyl]borate
Tris[1 - (di-n-octyloxyphosphinyl) - 2-methylpropyl]borate
Tris[1-(diethoxyphosphinyl)butyl]borate
Tris[1-(di-n-butoxyphosphinyl)hexyl]borate
Tris[1-(dimethoxyphosphinyl)-2-ethylhexyl]borate
Tris[1-(di-n-hexyloxyphosphinyl)dodecyl]borate
Tris[1-(didodecyloxyphosphinyl)propyl]borate
Tris[1-(di-n-propoxyphosphinyl)heptyl]borate
Tris{1 - [bis(2 - ethylhexyloxy)phosphinyl]-2-methylpropyl}borate Tris(haloalkyl) phosphites react with boron trichloride and an alkanecarboxaldehyde to give tris{1-[bis(haloalkoxy)phosphinyl]alkyl}borates. Thus, reaction of tris-(2-chloroethyl) phosphite with propionaldehyde and boron trichloride gives tris{1-[bis(2-chloroethoxy)phosphinyl]propyl}borate; tris(2-chloropropyl)phosphite, boron trichloride and acetaldehyde yield tris{1-[bis(2-chloropropoxy)phosphinyl]ethyl} borate; tris(tetrachlorohexyl) phosphite, boron trichloride and butyraldehyde give tris{1-[bis-(tetrachlorohexyloxy)phosphinyl]butyl}borate; tris-(2-fluoroethyl)phosphite, 2-ethylhexanal and boron trichloride give tris{1-[bis-(2-fluoroethoxy)phosphinyl]-2-ethylhexyl}borate; tris(dibromooctyl)phosphite, valeraldehyde and boron trichloride give tris{1-[bis(dibromooctyloxy)phosphinyl]pentyl}borate; and tris(2-iodoethyl) phosphite, lauraldehyde and boron trichloride give tris{1-[bis(2-iodoethoxy)phosphinyl]dodecyl}borate.

Esters of hydrocarbylphosphonous acids react with boron trichloride and formaldehyde to give tris[(alkoxyhydrocarbylphosphinyl)methyl]borates, i.e., compounds of the formula

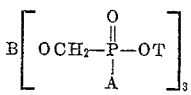

where A is a hydrocarbyl radical of from 1 to 12 carbon atoms which is free of aliphatic unsaturation and T is selected from the class consisting of alkyl and haloalkyl radicals of from 1 to 12 carbon atoms. Thus, reaction of boron trichloride with formaldehyde and diethyl phenylphosphonite gives tris[(ethoxyphenylphosphinyl)methyl]borate, i.e., a compound of the above formula in which A is phenyl and T is ethyl. Other compounds of the above formula which are prepared according to the invention from a hydrocarbylphosphonite, formaldehyde and a boron trihalide are, e.g., Tris[(methoxypropylphosphinyl)methyl]borate
Tris[(methoxy-α-naphthylphosphinyl)methyl]borate
Tris[(ethoxyhexylphosphinyl)methyl]borate
Tris[n-butoxycyclohexylphosphinyl)methyl]borate
Tris[(2-chloroethoxydodecylphosphinyl)methyl]borate
Tris[(2-chloropropoxy-4-tolylphosphinyl)methyl]borate The phosphonites react with boron trichloride and an alkanecarboxaldehyde to give tris[(alkoxyhydrocarbylphosphinyl)alkyl]borates or tris[(haloalkoxyhydrocarbylphosphinyl)alkyl]borates, depending upon whether an alkyl or haloalkyl ester of the hydrocarbylphosphonous acid is employed, i.e., compounds of the formula

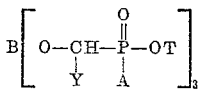

where Y is an alkyl radical of from 1 to 12 carbon atoms, A is a hydrocarbyl radical of from 1 to 12 carbon atoms which is free of aliphatic unsaturation and T is selected from the class consisting of alkyl and haloalkyl radicals of from 1 to 12 carbon atoms. Thus, from diethyl phenylphosphonite, acetaldehyde and boron trichloride there is obtained tris[1-(ethoxyphenylphosphinyl)ethyl]borate, i.e., a compound of the above formula in which Y is methyl, A is phenyl and T is ethyl. Other compounds of the above formula provided by the invention from boron trichloride or tribromide, a hydrocarbylphosphonite and either an alkanecarboxaldehyde or a substitution product thereof are shown in the table below:

| Y= | A= | T= |
|---|---|---|
| methyl | ethyl | ethyl |
| pentyl | isopropyl | methyl |
| ethyl | phenyl | dodecyl |
| propyl | cyclohexyl | 2-ethylhexyl |
| butyl | α-naphthyl | n-butyl |
| hexyl | decyl | 2-chloroethyl |
| 2-ethylhexyl | tert-butyl | 2-chloropropyl |
| n-decyl | 2-ethylhexyl | dichlorooctyl |
| n-dodecyl | p-tolyl | heptyl |
| heptyl | α-methyl-β-naphthyl | decyl |
| methyl | benzyl | 2-fluoroethyl |
| undecyl | pentyl | methyl |
| n-octyl | cyclopropyl | 3-bromopropyl |
| ethyl | n-hexyl | tert-nonyl |
| methyl | n-dodecyl | tetrachlorobutyl |
| tert-butyl | n-propyl | 2-iodopropyl |

The phosphinites react with boron trichloride or boron tribromide and formaldehyde to give compounds of the formula

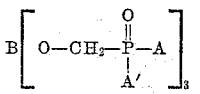

in which A and A′ are hydrocarbyl radicals which are free of aliphatic unsaturation and contain from 1 to 12 carbon atoms. Thus, boron trichloride, formaldehyde and ethyl diphenylphosphinite give tris[(diphenylphosphinyl)methyl]borate. Using an alkanecarboxaldehyde instead of formaldehyde, the products are tris[(dihydrocarbylphosphinyl)alkyl]borates, e.g., acetaldehyde, methyl di-n-butylphosphinite and boron trichloride yield tris[1-(di-n-butylphosphinyl)ethyl]borate.

Reaction of a dihalohydrocarbylborane with formaldehyde and a trialkyl phosphite or a tris(haloalkyl) phosphite yields bis[(dialkoxyphosphinyl)methyl]hydrocarbonboronates when a trialkyl phosphite is used or bis{[bis(haloalkoxy)phosphinyl]methyl}hydrocarbonboronates when a tris(haloalkyl)phosphite is used, i.e., compounds for the formula

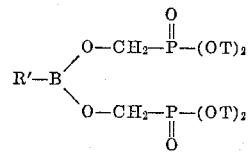

wherein R′ is a hydrocarbyl radical and which contains from 1 to 12 carbon atoms and T is selected from the class consisting of alkyl and halogen-substituted alkyl radicals of from 1 to 12 carbon atoms. Thus, from dichloroethylborane, and substantially two moles each of formaldehyde and of trimethyl phosphite there is obtained bis[(dimethoxyphosphinyl)methyl]ethaneboronate, i.e., a compound of the formula in which R′ is ethyl and T is methyl. Similarly, from dichloroethylborane, formaldehyde and tris(2-chloroethyl)phosphite there is obtained bis{[bis(2-chloroethoxy)phosphinyl]methyl}ethaneboronate; and from cyclohexyldichloroborane, formaldehyde and tridodecyl phosphite there is obtained bis-[(didodecyloxyphosphinyl)methyl]cyclohexaneboronate.

The reaction of a dichlorohydrocarbylborane, an alkanecarboxaldehyde and a trialkyl or tris(haloalkyl)phosphite gives either bis[1-(dialkoxyphosphinyl)alkyl]hydrocarbonboronates or bis{1-[bis(haloalkoxy)phosphinyl]alkyl} hydrocarbonboronates, depending upon whether a trialkyl phosphite or a tris(haloalkyl)phosphite is used, i.e., the products thus obtained have the formula

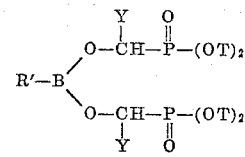

where R′ and T are defined above and Y is an alkyl radical of from 1 to 12 carbon atoms. Thus, the reaction product of dichloropentylborane, acetaldehyde and tri-n-propyl phosphite gives a compound in which R′ of the above formula is pentyl, T is propyl and Y is methyl, i.e., bis[1-(dipropoxyphosphinyl)ethyl]pentaneboronate. Other compounds prepared according to the present process from a dichlorohydrocarbylborane, an alkanecarboxaldehyde and a trialkyl or tris(haloalkyl) phosphite are as follows:

Bis[1-(dimethoxyphosphinyl)propyl]benzeneboronate
Bis[1-(diethoxyphosphinyl)ethyl]α-naphthaleneboronate
Bis[1-(diethoxyphosphinyl)-2-ethylhexyl]ethaneboronate
Bis[1-(didodecyloxyphosphinyl)ethyl]biphenylboronate
bis{1 - [bis(2 - bromoethoxy)phosphinyl]undecyl}p - tolueneboronate
Bis{1 - [bis(2 - chloropropoxy)phosphinyl]butyl}2 - phenylethaneboronate
Bis{1 - [bis(2 - ethylhexyloxy)phosphinyl]propyl}propeneboronate
Bis{1 - [bis(2 - iodoethoxy)phosphinyl]ethyl}benzeneboronate
Bis[1-(diethoxyphosphinyl)ethyl]cyclohexaneboronate
Bis{1 - [bis(2 - chloropropoxy)phosphinyl] - 2 - methylpropyl}3-butyneboronate Bis{1 - [bis(2 - chloroethoxy)phosphinyl]butyl}butaneboronate Employing a benzenoid carboxaldehyde with the dichlorohydrocarbylborane and a trialkyl phosphite yields the bis[1-(dialkoxyphosphinyl)aralkyl]hydrocarbonboronate, i.e., compounds of the formula

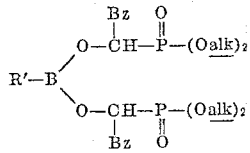

in which R′ is a hydrocarbyl radical which contains from 1 to 12 carbon atoms, Bz denotes a benzenoid radical which is free of aliphatic unsaturation and contains from 6 to 12 carbon atoms and alk denotes an alkyl radical of from 1 to 12 carbon atoms. Thus, dichlorophenylborane, benzaldehyde and trimethyl phosphite give bis[α-(dimethoxyphosphinyl)benzyl]benzeneboronate; dichloro-n-propylborane, p-tolualdehyde and tris(2-chloroethyl)phosphite gives bis{α-[bis(2-chloroethoxy)phosphinyl]-p-methylbenzyl}n-propaneboronate; dichlorocyclohexylborane, phenylacetaldehyde and triethyl phosphite gives bis[1-(diethoxyphosphinyl) - 2 - phenyl-ethyl]cyclohexaneboronate; dichloro-2-pentenylborane, p-isopropylbenzaldehyde, and tri-n-butyl phosphite gives bis[α-(di-n-butoxyphosphinyl)-p-isopropylbenzyl]2-penteneboronate; dichloro-4-biphenylylborane, benzaldehyde and tetrachlorododecyl phosphite gives bis{α-[bis(tetrachlorododecyloxy)phosphinyl]benzyl}4-biphenylboronate; dichlorobenzylborane, β-naphthaldehyde, and triethyl phosphite gives bis[(diethoxyphosphinyl) (α-naphthyl)methyl] phenylmethaneboronate; dichloro(4-pentylphenyl)borane, benzaldehyde and tris(2-bromoethyl)phosphite gives bis{α-[bis(2 - bromoethoxy)phosphinyl]benzyl}4 - pentylbenzeneboronate; dichlorophenylborane, o-tolualdehyde, and tris(2-fluoroethyl)phosphite gives bis{α-[bis(2-fluoroethoxy)phosphinyl] - o - methylbenzyl}4 - pentylbenzeneboronate, etc.

When employing as the dihalo boron component a dichlorohydrocarbyloxyborane and using as the aldehyde an alkanecarboxaldehyde, the products which are obtained with the trialkyl phosphites are bis[(dialkoxyphosphinyl)-alkyl]hydrocarbyl borates, i.e., they have the structure

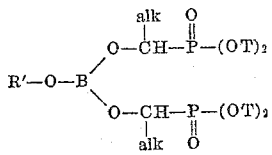

wherein R′ is a hydrocarbyl radical of from 1 to 12 carbon atoms, and alk and T denote an alkyl radical of from 1 to 12 carbon atoms. An example thereof is bis[1-(diethoxyphosphinyl)ethyl]ethyl borate which is prepared from dichloroethoxyborane, acetaldehyde and triethyl phosphite. Variation of the dichloroethoxyborane to another dihalohydrocarbyloxyborane, of acetaldehyde to another alkanecarboxaldehyde and of triethyl phosphite to another trialkyl phosphite or to a tris(haloalkyl) phosphite gives, for example, bis[1-(diethoxyphosphinyl)propyl]phenyl borate; bis[1-(dibutoxyphosphinyl)hexyl]-n-butyl borate; bis[1-(methoxyethoxymethoxyphosphinyl)butyl]-p-tolyl borate; bis[1-(2-chloroethoxymethoxyphosphinyl)-octyl]allyl borate; bis[1-didodecylphosphinyl)propyl]-n-octyl borate; bis{1-[bis(2-ethylhexyloxy)phosphinyl]ethyl}phenyl borate; bis[1-(diethoxyphosphinyl)-2-ethylhexyl]phenyl borate, etc.

When the dichloro boron compound is a dichlorohydrocarbyloxyborane, the aldehyde is a benzenoid aldehyde and the phosphite is a trialkyl phosphite, the products are bis[α-(dialkoxyphosphinyl)aralkyl]hydrocarbyl borates. Examples of compounds thus provided are bis[α-(diethoxyphosphinyl)benzyl]phenyl borate, which is prepared from dichlorophenoxyborane, benzaldehyde and triethyl phosphite; bis[α-(dibutoxyphosphinyl)benzyl]2-propynyl borate; bis[1-(diisopropoxyphosphinyl)-2-phenylethyl]-dodecylborate; bis{α-[2-ethylhexyloxy)phosphinyl]-p-ethylbenzyl}benzyl borate; and bis[1-(dimethoxyphosphinyl)-3-phenylethyl]p-tolyl borate.

When the phosphite is a haloalkyl phosphite, the products obtained from a dichlorohydrocarbyloxyborane and an aromatic aldehyde are bis{1-[bis(haloalkoxyphosphinyl]aralkyl} hydrocarbyl borates, e.g., bis{1-[bis(2-chloroethoxy)phosphinyl]benzyl} phenyl borate which is prepared according to the invention from dichlorophenoxyborane, benzaldehyde and tris(2-chloroethyl) phosphite.

As stated above, the dihalohydrocarbyloxyborane compound may have one or more halogen substituents in the organic portion of the molecule. Thus, according to the invention, there are prepared bis[1-(dimethoxyphosphinyl)ethyl] o-, m- or p-chlorophenyl borate from dichloro(o-, m- or p-chlorophenoxy)borane, acetaldehyde and trimethyl phosphite; bis{α-[bis(2-chloroethoxy)phosphinyl]-benzyl} dibromophenyl borate from (dibromophenoxy)dichloroborane, benzaldehyde and tris(2-chloroethyl) phosphite; bis[1-(di-n-propoxyphosphinyl)-2-ethylhexyl] 4-(trifluoromethyl)phenyl borate from dichloro-4-(trifluoromethyl)phenylborane, 2-ethylhexanal and tri-n-propyl phosphite; bis[α-(didodecyloxyphosphinyl)benzyl] 2-chloroethyl borate from dichloro(2-chloroethoxyborane), benzaldehyde and tridodecyl phosphite; bis[1-(di-n-hexyloxyphosphinyl)-ethyl] octachlorobiphenylyl borate from dichloro(octachlorobiphenylyloxy)borane, acetaldehyde and tris-n-hexyl phosphite, bis-[(diethoxyphosphinyl)methyl] 3,3-dibromopropyl borate from dichloro(3,3-dibromopropoxy)borane, formaldehyde and triethyl phosphite; bis{[bis(2-chloropropoxy)phosphinyl](α-naphthyl)methyl} 2,5-dibromophenyl borate from dichloro(2,5 - dibromophenoxy)borane, α-naphthaldehyde and tris(2-chloropropyl) phosphite; bis[1-(di-ethoxyphosphinyl)ethyl] 3-chloropropenyl borate from dichloro(3-chloropropenyl)borane, acetaldehyde and triethyl phosphite; bis[1-(diamyloxyphosphinyl)-2-ethylhexyl] 4-iodobutyl borate from dichloro(4-iodobutoxy)borane, 2-ethylhexana and triamyl phosphite.

When the dihalo boron reactant is a thio ester, the compounds prepared according to the present process are esters in which the —SH group is esterified with the organic residue of the boron compound used in the reaction and each of the —OH groups by a (dialkoxyphosphinyl)hydrocarbyl or a [bis(haloalkyl)phosphinyl]-hydrocarbyl radical, i.e., they have the structural formula

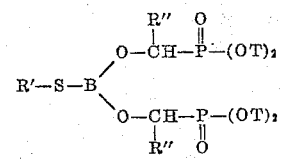

in which R′ designates a hydrocarbyl radical of from 1 to 12 carbon atoms which may or may not be halogen-substituted, R″ designates hydrogen or a hydrocarbyl radical of from 1 to 12 carbon atoms, T is an alkyl radical, and in which both R′ and R″ are free of aliphatic unsaturation. The reaction of dichloro(phenylthio)-borane, formaldehyde and trimethyl phosphite gives bis[(dimethoxyphosphinyl)methyl] S-phenyl thioborate, i.e., a compound of the above formula in which R′ is phenyl, R″ is hydrogen and T is methyl; and reaction of dichloro(ethylthio)borane, benzaldehyde and tris(2-chloroethyl) phosphite gives bis{α-[bis(2-chloroethoxy)-phosphinyl]benzyl} S-ethyl thioborate, i.e., a compound of the above formula in which R′ is ethyl, R″ is phenyl and T is 2-chloroethyl. Examples of other compounds of the above formula which are prepared by the present process are shown in the table below:

| R' | R'' | T |
|---|---|---|
| α-naphthyl | methyl | ethyl |
| 4-biphenylyl | methyl | isopropyl |
| methyl | n-butyl | methyl |
| p-tolyl | n-hexyl | n-butyl |
| benzyl | phenyl | 2-chloroethyl |
| 2-phenylethyl | ethyl | amyl |
| 3-chloropropyl | p-tolyl | dodecyl |
| 4-amylbenzyl | 2-ethylpentyl | ethyl |
| dibromobutyl | undecyl | methyl |
| 2-dodecenyl | methyl | n-propyl |
| phenyl | n-propyl | n-octyl |
| pentachlorophenyl | methyl | ethyl |
| dodecyl | phenyl | ethyl |
| pentachlorophenyl | ethyl | 2-chloroethyl |
| octachlorobiphenylyl | ethyl | 2-chloropropyl |
| 4-(trichloromethyl)phenyl | propyl | methyl |
| 2,3,4-trimethylphenyl | ethyl | n-hexyl |
| 4-chloro-3-methylphenyl | phenyl | isodecyl |
| 4-iodophenyl | 4-n-butylphenyl | methyl |
| 2-hexynyl | α-naphthyl | methyl |

As hereinbefore stated, the dihalohydrocarbylboranes, the dihalohydrocarbyloxyboranes and the dihalo(hydrocarbylthio)-boranes react with a variety of aldehydes and a variety of triorgano phosphites. There are thus obtained phosphinyl boron compounds of the formula

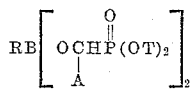

where R is derived from the RBCl₂ or RBBr₂ compound, A from the aldehyde ACHO, and T from the phosphite P(OT)₃. Thus, for example, the following compounds of the above formula are thus provided:

| R= | A= | T= |
|---|---|---|
| 4-chlorophenyl | 4-tolyl | ethyl. |
| α-naphthyl | 2-chloroethyl | methyl. |
| biphenylyl | 4-methoxybutyl | n-butyl. |
| 2-tolyl | 3-carboethoxypropyl | n-pentyl. |
| benzyl | 2-furyl | 2-chloroethyl. |
| 2-chloroethyl | 3-cyanopropyl | 2-chloropropyl. |
| dodecyl | 2,3-dichloropropyl | n-dodecyl. |
| phenyl | 4-fluorobutyl | n-octyl. |
| octachlorobiphenylyl | iodomethyl | 2-ethylhexyl. |
| allyl | benzyl | trichloropropyl. |
| iodophenyl | 8-methoxyheptyl | n-propyl. |
| 2-phenylethyl | 2-thienyl | n-butyl. |
| trichloropropyl | 4-ethylphenyl | ethyl. |
| n-octyl | methylenedioxaphenyl | sec-pentyl. |
| cyclohexenyl | 4-cyanophenyl | ethyl. |
| pentyl | 4-carboethoxyphenyl | ethyl. |
| 4-butylphenyl | 2-chloro-4-tolyl | methyl. |
| 2,4-dichlorophenyl | 2-furyl | 2-ethylhexyl. |
| 4-(trifluoromethyl)phenyl | benzyl | methyl. |
| ethoxy | 4-methoxyphenyl | n-heptyl. |
| ethylthio | 2-cyanobenzyl | 2-chloroethyl. |
| phenylthio | 3-carbobutoxyethyl | tetrachlorobutyl. |
| 2-chloroethoxy | 2-chloro-4-tolyl | isopropyl. |
| 2-chloropropoxy | 5-methyl-2-furyl | sec-butyl. |
| (2-chloroethyl)thio | 5-methoxy-2-thienyl | n-octyl. |
| α-naphthylthio | trichlorobutyl | sec-dodecyl. |
| 2-propynyloxy | pentachlorophenyl | n-pentyl. |
| tert-dodecylthio | phenyl | 2-chloropropyl. |
| benzylthio | α-naphthyl | ethyl. |
| 2,4-dibromobenzylthio | biphenylyl | n-propyl. |
| methyl | 4 ethylphenyl | sec-nonyl. |
| 2-ethylhexyl | 2,4-dichlorobenzyl | methyl. |
| 4-hexylphenyl | β-methoxy-α-naphthyl | ethyl. |
| cyclopentyl | trichloromethyl | methyl. |

Ketones react with the dihalo boron compounds and the triorgano phosphites as follows:

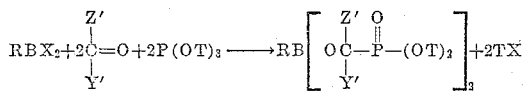

in which R is selected from the class consisting of hydrocarbyl-, halohydrocarbyl-, hydrocarbyloxy-, halohydrocarbyloxy-, hydrocarbylthio- and halohydrocarbylthio radicals wherein the hydrocarbyl group has from 1 to 12 carbon atoms, X is chlorine or bromine, Y' is one of the radicals: alkyl of 1 to 12 carbon atoms, benzenoid of 6 to 11 carbon atoms, furyl or thienyl or said radicals carrying a substituent selected from the class consisting of halogen, cyano, methylenedioxy, alkyl, —O-alkyl and —COO-alkyl wherein the alkyl radical has from 1 to 5 carbon atoms, Z' is an alkyl radical of from 1 to 3 carbon atoms, and Z' and Y' together complete a cycloalkane ring having from 5 to 6 carbon atoms in the ring and a total of from 5 to 10 carbon atoms; and T is selected from the class consisting of alkyl and haloalkyl radicals of from 1 to 12 carbon atoms. There are thus obtained, e.g., the following:

Bis[2 - (dimethoxyphosphinyl)propyl] ethyl borate from dichloroethoxyborane, acetone and trimethyl phosphite.

Bis[2-(diethoxyphosphinyl)butyl] S-phenyl thioborate from dichlorophenylthioborane, 2-butanone and triethyl phosphite.

Bis{α - [bis(2 - chloroethoxy)phosphinyl]-α-methylbenzyl} 4-chlorophenyl borate from dibromo-(4-chlorophenoxy)borane, acetophenone and tris(2-chloroethyl) phosphite.

Bis[α-(di-n-butoxyphosphinyl)-α-methylfurfuryl] S-2-chloroethyl thioborate from dichloro-(2-chloroethylthio)borane, 2-furyl methyl ketone and tri-n-butyl phosphite.

Bis[2-(didodecyloxyphosphinyl) - 5 - ethoxy)pentyl] 2-propynyl borate from dichloro-(2-propynyloxy)borane, 5-ethoxy-2-pentanone and tridodecyl phosphite.

Bis[3 - (diethoxyphosphinyl)pentyl] benzeneboronate from dichlorophenylborane, 3-pentanone and triethyl phosphite.

Bis{2 - [bis(2 - chloroethoxy)phosphinyl]tetradecyl} 4-penteneboronate from dibromo-4-pentenylborane, 2-tetradecanone and tris-(2-chloropropyl) phosphite.

Bis[3-(di-n-butoxyphosphinyl)-7-chloroheptyl] cyclohexane-boronate from dichlorocyclohexylborane, 7-chloro-2-heptanone and tri-n-butyl phosphite.

The alkyl or chloroalkyl esters of hydrocarbylphosphonites or of dihydrocarbylphosphinites can be used instead of the phosphites in the reaction with the dihalo boron compound and the carbonyl compound. Use of the hydrocarbylphosphonites gives compounds of the formula

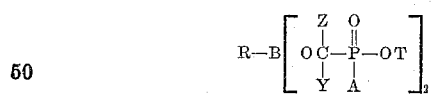

in which R, Z, Y and T are as defined above and A is a hydrocarbyl radical which is free of aliphatic unsaturation and contains from 1 to 12 carbon atoms. Thus, reaction of dichloroethylborane, acetaldehyde and dimethyl phenylphosphonite gives bis[1-(methoxyphenylphosphinyl)ethyl] ethaneboronate, i.e., a compound in which R of the above formula is ethyl, Z is hydrogen, Y is methyl, A is phenyl and T is methyl. Similarly, reaction of dichloro(phenylthio)borane, acetone, and diethoxy propylphosphonite gives bis[2-(ethoxypropylphosphinyl)propyl] S-phenyl thioborate, i.e., a compound of the above formula in which R is the phenylthio radical, Z and Y are both methyl, A is propyl and T is ethyl.

With the dihydrocarbylphosphinites, the products have the formula

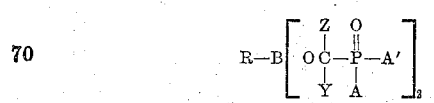

wherein R, Z, Y and A are as above defined and A', like A, is a hydrocarbyl radical which is free of aliphatic unsaturation and which contains from 1 to 12 carbon atoms. From dichlorobutylborane, benzaldehyde and ethyl dibutylphosphinite there is obtained bis[α-(dibutylphosphinyl)benzyl] butylboronate, i.e., a compound of the above formula in which R is butyl, Z is hydrogen, Y is phenyl, and A and A′ are butyl; and from dibromo(chlorophenoxy)borane, propionaldehyde and methyl dibenzylphosphinite there is obtained bis[1-(dibenzylphosphinyl)butyl] chlorophenyl borate.

When there is employed as the halogen-containing boron compound a halodihydrocarbyloxyborane or a halobis(halohydrocarbyloxy)borane, the products prepared according to the present process have the formula

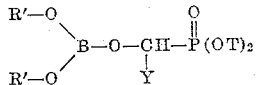

where R′ is a hydrocarbon radical of from 1 to 12 carbon atoms or such a radical carrying halogen substitution, Y is selected from the class of hydrogen and hydrocarbyl radicals which are free of aliphatic unsaturation and which contain from 1 to 12 carbon atoms and T is an alkyl or haloalkyl radical of from 1 to 12 carbon atoms, i.e., the compounds are dihydrocarbyl, bis(halohydrocarbyl) or hydrocarbyl halohydrocarbyl 1-[dialkoxy- or bis(haloalkoxy)-phosphinyl]hydrocarbyl borates.

When the boron compound is a halobis(hydrocarbylthio)borane or a halobis(halohydrocarbylthio)borane, the products have the formula

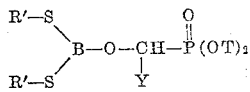

wherein R′, Y and T are as defined above, i.e., the compounds are S,S-dihydrocarbyl, S,S-bis(halohydrocarbyl), S-hydrocarbyl S-halohydrocarbyl 1-[dialkoxy- or bis-(haloalkoxy)phosphinyl]hydrocarbyl dithioborates.

Similarly, when the boron halide is halohydrocarbyloxy-(hydrocarbylthio)borane or a compound in which one or both of the hydrocarbyl radicals carry halogen substitution, the products have the formula

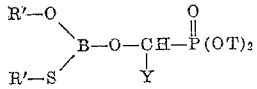

wherein R′, Y and T are as herein defined, i.e., they are O-hydrocarbyl S-hydrocarbyl 1-[dialkoxy- or bis(haloalkoxy)phosphinyl]-hydrocarbyl thioborates where the O- and/or the S-hydrocarbyl radicals may or may not be halogen-substituted.

When the halogen-containing boron compound is a halodihydrocarbylborane wherein one or both of the hydrocarbyl radicals may or may not be halogen-substituted, the products are 1-(dialkoxyphosphinyl)alkyl dihydrocarbylborinates wherein halogen substitution may or may not be present in the alkoxy and/or the hydrocarbyl radical, i.e., they have the formula

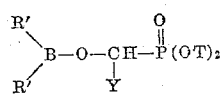

wherein R′, Y and T are as defined above.

When the boron compound is a halohydrocarbylhydrocarbyloxyborane or a halogen-substitution product thereof, the presently provided compounds have the formula

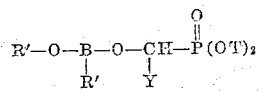

in which R′, Y and T are as defined above, i.e., they are 1-(dialkoxyphosphinyl)alkyl hydrocarbylboronates wherein the alkoxy and/or the hydrocarbyl radicals may or may not carry halogen substitution.

When the halogenated boron compound is a halohydrocarbyl(hydrocarbylthio)borane or a halogen substitution product thereof, the presently provided compounds have the formula

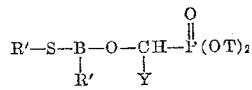

in which R′, Y and T are as herein defined, i.e., they are 1-(dialkoxyphosphinyl)alkyl S-hydrocarbyl hydrocarbylboronates or halogen substitution products thereof.

An example of a compound of the formula

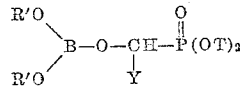

which is provided according to the present process is dibutyl 1-(diethoxyphosphinyl)methyl borate, i.e., it is a compound in which R′ of the above formula is the butyl radical, Y is hydrogen, and T is the ethyl radical. It is prepared from dibutoxychloroborane, formaldehyde and triethyl phosphite. α-[Bis(chloroethoxy)-phosphinyl] benzyl bis(chlorophenyl) borate, i.e., a compound of the above formula in which R′ is a 4-chlorophenyl radical, Y is the phenyl radical, and T is the 2-chloroethyl radical, is prepared from chlorobis(4-chlorophenoxy)borane, benzaldehyde and tris(2-chloroethyl) phosphite. Other compounds of this formula prepared according to the invention are, for example:

Diethyl 1-(diethoxyphosphinyl)ethyl borate
Diphenyl 1-[bis(2-ethylhexyloxy)phosphinyl]-2-ethylhexyl borate
Bis(4-chlorophenyl) α-[bis(2-chloroethoxy)phosphinyl] benzyl borate
Di-α-naphthyl 1-(dibutoxyphosphinyl)propyl borate
Dibiphenylyl 1-(dimethoxyphosphinyl)butyl borate
Bis(2-chloroethyl) 1-didecyloxyphosphinyl)ethyl borate
Bis(pentachlorophenyl) 1-(dinonyloxyphosphinyl)-2-methylpropyl borate
Diallyl 1-(dimethoxyphosphinyl)dodecyl borate
Bis(4-iodobenzyl) 1-diisopropoxyphosphinyl)hexyl borate
Di-p-tolyl [bis(2-chloropropoxy)phosphinyl]-α-naphthylmethyl borate
Bis(2-bromo-4-ethylphenyl) 1-diethoxyphosphinyl)ethyl borate
Bis(octachlorobiphenylyl) α-[bis(2-chloroethoxy)phosphinyl]-benzyl borate.
Bis[4-trichloromethyl)phenyl 1-(didodecyloxyphosphinyl) ethyl borate
4-pentynyl ethyl α-[bis(α-chloroethoxy)phosphinyl] benzyl borate An example of a compound of the formula

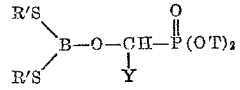

prepared according to the present process is the S,S-diphenyl 1-(diethoxyphosphinyl)methyl dithioborate, i.e., it is a compound in which R′ is the phenyl radical, Y is hydrogen, and both T's are ethyl radicals. It is prepared according to the invention from chlorobis(phenylthio) borane, formaldehyde and triethyl phosphite. Another compound of the above formula which is prepared according to the invention is the S,S-diethyl 1-[bis(2-chloropropoxyphosphinyl)ethyl]borate, i.e., it is a compound in which R′ of the above formula is the ethyl radical, Y is the methyl radical and both T's are 2-chloropropyl radicals. It is prepared from chloro-bis(ethylthio)borane, acetaldehyde and tris(2-chloropropyl) phosphite. Other compounds of the above formula provided by the invention are conveniently set forth in the table below:

| R' | Y | T |
|---|---|---|
| phenyl | ethyl | methyl. |
| dodecyl | n-butyl | n-butyl. |
| pentachlorophenyl | phenyl | 2-chloroethyl. |
| benzyl | 2-ethylpentyl | dodecyl. |
| propenyl | methyl | n-hexyl. |
| p-tolyl | nonyl | 2-fluoroethyl. |
| β-naphthyl | 2-methylpropyl | n-octyl. |
| 2-chloroethyl | ethyl | ethyl. |
| 4-iodobutyl | α-naphthyl | 2-iodoethyl. |
| 2,4-dichlorobenzyl | methyl | decyl. |
| 4-(trifluoromethyl)phenyl | ethyl | n-propyl. |
| octachlorobiphenylyl | phenyl | methyl. |

Compounds of the formula

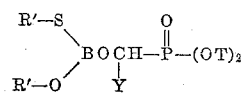

prepared according to the present process are, e.g., the O-phenyl S-phenyl 1-(dibutoxyphosphinyl)methyl thioborate (R'=phenyl, T=butyl and Y=H) which is prepared from chlorophenyl(phenylthio)borane, formaldehyde and tri-n-butyl phosphite; the O-ethyl S-ethyl 1-[bis(2-chloroethoxy)phosphinyl]propyl thioborate which is prepared from chloroethyl(ethylthio)borane, propionaldehyde and tris(2-chloroethyl) phosphite; and the O-butyl S-2,4-dichlorophenyl α-[bis(3-bromopropoxy)benzyl borate which is prepared from butylchloro(2,4-dichlorophenylthio)borane, benzaldehyde and tris-(3-bromopropyl) phosphite.

Compounds of the formula

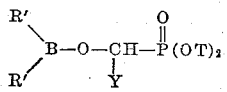

prepared according to the present process are, e.g., the (diethoxyphosphinyl)methyl diphenylborinate which is obtained from chlorodiphenylborane, formaldehyde and triethyl phosphite; 1-[bis-(2-ethylhexyloxy)phosphinyl] propyl diethylborinate which is obtained from chlorodiethylborane, propionaldehyde and tris(2-ethylhexyl) phosphite; the α-[bis(2-chloroethoxy)phosphinyl]benzyl 4-chlorophenyl-α-naphthylborinate which is obtained from chloro(4-chlorophenyl)-α-naphthylborane, benzaldehyde and tris(2-chloroethyl) phosphite; and the (didodecyloxyphosphinyl)-α-naphthylmethyl dioctylborinate which is obtained from chlorodioctylborane, α-naphthaldehyde and tridodecyl phosphite.

Examples of compounds of the formula

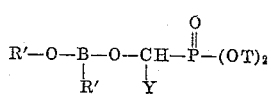

provided by the invention are the phenyl (dimethoxyphosphinyl)methyl p-chlorobenzylboronate which is obtained from chloro(p-chlorophenyl)phenoxyborane, formaldehyde and trimethyl phosphite; the ethyl 1-[bis-(2-fluoroethoxy)phosphinyl]-2-phenylethyl β-naphthaleneboronate which is prepared from chloroethoxy-β-naphthylborane, phenylacetaldehyde and tris(2-fluoroethyl) phosphite; and the trichloropropyl 1-[bis(2-butyloctyloxy)phosphinyl]propyl butaneboronate which is prepared from butylchloro(trichloropropoxy)borane, propionaldehyde and tris(2-butyloctyl) phosphite.

Compounds of the formula

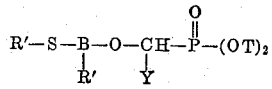

prepared according to the present process are, e.g., the S-p-bromophenyl (diisopropoxyphosphinyl)methyl benzenethioboronate which is prepared from (p-bromophenylthio)chlorophenylborane, formaldehyde and triisopropyl phosphite; the S-ethyl α-[bis(chloroethoxy)phosphinyl]benzyl biphenylthioboronate which is prepared from biphenylylchloro(ethylthio)borane, benzaldehyde and tris(2-chloroethyl) phosphite; and the S-propenyl 1-(di-n-hexyloxyphosphinyl)butyl dodecanethioboronate which is prepared from chlorododecyl(propenylthio)borane, butyraldehyde and tri-n-hexyl phosphite.

A particularly valuable class of compounds provided by the invention are the bis(chloroalkyl) 1-[bis(haloalkoxy)phosphinyl]alkyl borates, i.e., compounds of the formula

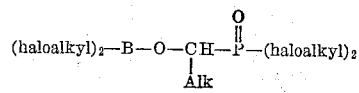

where alk denotes an alkyl radical of from 1 to 12 carbon atoms. Such products are obtained by reaction of a chlorobis(haloalkoxy)borane, an alkanecarboxaldehyde, and a tris(haloalkyl) phosphite. Thus, chlorobis(2-chloroethoxy)borane, acetaldehyde and tris(2-chloroethyl) phosphite give bis(2-chloroethyl) 1-[bis(2-chloroethoxy)phosphinyl]ethyl borate; and chlorobis(2-chloropropoxy)borane, acetaldehyde and tris(2-chloropropyl) phosphite give bis(2-chloropropyl) 1-[bis(2-chloropropoxy)phosphinyl]ethyl borate.

A variety of aldehydes and a variety of triorganophosphites give phosphinyl boron compounds when reacted with monohaloborane compounds of the formula (Hydrocarbyl)$_2$BX
(Hydrocarbyloxy)$_2$BX
(Hydrocarbylthio)$_2$BX
Hydrocarbyl(hydrocarbyloxy)BX
Hydrocarbyl(hydrocarbylthio)BX
Hydrocarbyloxy(hydrocarbylthio)BX or compounds in which the hydrocarbyl radical is halogen substituted. The compounds thus obtained have the general formula

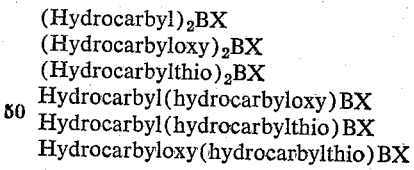

in which R and R'' are derived from the boron compound R(R'')BX where X is chlorine or bromine and R and R'' are either a hydrocarbyl, a hydrocarbyloxy, or a hydrocarbylthio radical wherein said hydrocarbyl radical may or may not carry halogen as substituent, A is the substituent of the formyl group of an aldehyde ACHO and T is either an alkyl or haloalkyl radical. Thus, by using the appropriate R(R'')BX compound, the appropriate aldehyde and a trialkyl phosphite such as triethyl phosphite or tris(2-ethylhexyl) phosphite, or a tris(haloalkyl) phosphite such as tris(2-chloroethyl) or tris(2-chloropropyl) phosphite the following compounds are obtained:

| R= | R''= | A= |
|---|---|---|
| butyl | butyl | trichloromethyl |
| ethyl | methoxy | 4-cyanobutyl |
| phenyl | phenyl | 3-carboethoxypropyl |
| phenyl | 4-tolyl | methylenedioxyphenyl |
| α-naphthyl | α-naphthyl | 3,4-dichlorophenyl |
| 4-biphenylyl | ethoxy | α-naphthylmethyl |
| ethoxy | ethoxy | 2-chlorobenzyl |
| 2-chloroethoxy | propenyl | α-naphthyl |
| 2-chloroethoxy | 2-chloroethoxy | 2,3-dichloropropyl |
| 2,4-dichlorophenyl | 2,4-dichlorophenyl | 2-bromoethyl |
| ethyl | ethyl | 4-cyanophenyl |
| methyl | methyl | 3-ethoxypropyl |
| 2-butenyl | 2-butenyl | 2-methoxyphenyl |
| ethylthio | ethylthio | 4-ethylphenyl |
| ethylthio | ethyl | 4-methylbenzyl |
| 2-propynyloxy | 2-propynyloxy | 2-fluoroethyl |
| phenoxy | phenyl | 4-iodobenzyl |
| 4-tolyl | phenoxy | 3-methoxybenzyl |
| dodecylthio | dodecylthio | chloromethyl |
| n-octylthio | ethoxy | dibromomethyl |
| 4-biphenylyloxy | methyl | 2-cyanoethyl |
| 2-chloroethyl | 2-chloroethyl | 2-furyl |
| 2-chloropropyl | 2-chloropropyl | 4-butylphenyl |
| 4-chlorophenoxy | 4-chlorophenoxy | 2-thienyl |
| 3-iodophenyl | ethoxy | 5-methoxy-2-thienyl |
| 4-(trifluoromethyl)-phenyl | ethyl | 4-carbomethoxyphenyl |
| 3,4-dibromophenoxy | 3,4-dibromophenoxy | pentachlorophenyl |
| 2-chloroethylthio | 2-chloroethylthio | 4-(trichloromethyl)-phenyl |
| 2-bromopropoxy | 2-bromopropoxy | 3-cyanobenzyl |
| 4-fluorophenoxy | 2-fluorophenoxy | 5-chlorofuryl |
| cyclohexyl | cyclohexyl | β-ethyl-α-naphthyl |
| cyclohexyloxy | cyclohexyloxy | 3-cyanopropyl |
| cyclohexylthio | cyclohexylthio | 4-ethoxybutyl |
| cyclopentenyl | cyclopentenyl | benzyl |
| cyclopentyloxy | cyclopentylthio | phenyl |
| 4-cyclohexylphenyl | methyl | trichlorophenyl |
| 4-chlorocyclohexyl | 4-chlorocyclohexyl | 2-bromoethyl |
| pentachlorophenylthio | pentachlorophenylthio | 3-chloropropyl |

Ketones react with the mono-halo boron compounds and the triorgano phosphites as follows:

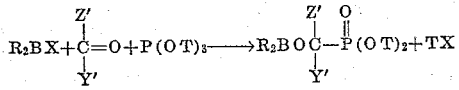

wherein R is either

Hydrocarbyl
Hydrocarbyloxy
Hydrocarbylthio
Halohydrocarbyl
Halohydrocarbyloxy or
Halohydrocarbylthio and wherein the hydrocarbyl group is free of aliphatic unsaturation and contains from 1 to 12 carbon atoms, Y' is one of the radicals: alkyl of 1 to 12 carbon atoms, benzenoid of 6 to 11 carbon atoms, furyl or thienyl or such a radical carrying a substituent selected from the class consisting of halogen, cyano, methylenedioxy, alkyl, O-alkyl and —COOalkyl where the alkyl group has from 1 to 5 carbon atoms; Z' is an alkyl radical of from 1 to 3 carbon atoms; and Z' and Y' together complete a cycloalkane ring having from 5 to 6 carbon atoms in the ring and a total of from 5 to 10 carbon atoms; and T is selected from the class consisting of alkyl and haloalkyl radicals of from 1 to 12 carbon atoms. There are thus obtained, e.g., the following:

Diethyl 2-(diethoxyphosphinyl)propyl borate from chlorodiethoxyborane, acetone and triethyl phosphite S,S-phenyl 3-(dipropoxyphosphinyl)butyl borate from chloro-bis(phenylthio)borane, 3-pentanone and tripropyl phosphite S-benzyl O-chloroethyl 2-(dimethoxyphosphinyl)decyl borate from chloro(benzylthio)-2-chloroethoxyborane, 2-decanone and trimethyl phosphite Propyl α-[bis(2-chloropropoxy)phosphinyl]-α-methyl-benzyl benzeneboronate from bromophenylpropoxyborane, acetophenone and tris(2-chloropropyl) phosphite Phenyl α-(dibutoxyphosphinyl)-α-methylfurfuryl butaneboronate from butylchlorophenoxyborane, 2-furyl methyl ketone and tributyl phosphite 2-chloropropyl 4-(didodecyloxyphosphinyl)tetradecyl cyclohexaneboronate from chloro-2-chloropropoxycyclohexaneborane, 4-tetradecanone and tri-didodecyl phosphite S-4-chlorophenyl 2-(diethoxyphosphinyl)-1,1-dichloropropyl 4-chlorobenzeneboronate from chloro(4-chlorophenylthio)-4-chlorophenylborane, 1,1-dichloroacetone and triethyl phosphite α-(Dimethoxyphosphinyl)-α-methyl-4-chlorobenzyl diphenylborinate from chlorodiphenylborane, 4-chloroacetophenone and trimethyl phosphite 2 - [bis(2-chloroethoxy)phosphinyl]butyl dipropenylborinate from chlorodipropenylborane, 2-butanone and tris(2-chloroethyl) phosphite The cycloalkanones react with the monohaloboranes to give compounds of the formula

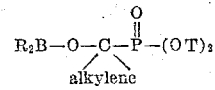

wherein the alkylene radical has from 4 to 5 carbon atoms in the chain and a total of from 5 to 10 carbon atoms and R and T are as above defined. Thus, chlorodiphenylborne, cyclohexanone and triethyl phosphite gives 1-(diethoxyphosphinyl)cyclohexyl diphenylborinate; chloromethoxypropylborane, cyclopentanone and tris(2-chloropropyl) phosphite give methyl 1-[bis(2-chloroethoxy) phosphinyl]cyclopentyl propaneboronate; chlorodicyclohexyloxyborane, cyclohexanone and tripentyl phosphite give dicyclohexyl 1-(dipentoxyphosphinyl)cyclohexyl borate; chlorobis(4-chlorophenylthio)borane, 2-butylcyclohexanone and tridodecyl phosphite give S,S-bis(4-chlorophenyl) 1 - (dodecyloxyphosphinyl)-2-butylcyclohexyl dithioborate.

Particularly valuable as the monohaloboron compounds are halogenated dioxa ring compounds of boron, i.e., compounds of the formula

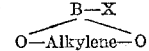

where the alkylene group has from 2 to 4 carbon atoms in the alkylene chain and a total of from 2 to 12 carbon atoms and X is halogen or bromine. The products obtained therefrom with an alkanecarboxaldehyde and a trialkyl phosphite have the formula

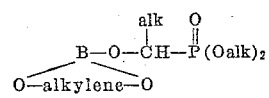

When the boron compound is 2-bromo- or 2-chloro-1,3,2-dioxaborolane, the aldehyde is acetaldehyde and the phosphite is triethyl phosphite the product is 2-[1-(diethoxyphosphinyl)ethoxy]-1,3,2-dioxaborolane:

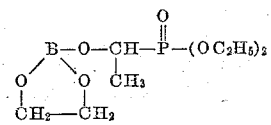

Similarly, the reaction of 2-bromo- or 2-chloro-1,3,2-dioxaborinane, benzaldehyde and tris(2-chloroethyl) phosphite gives 2-{α-[bis(2-chloroethoxy)phosphinyl]benzyloxy}-1,3,2-dioxaborinane:

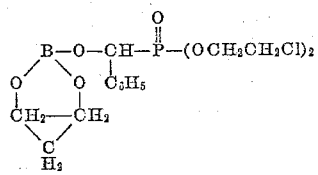

With 2-bromo- or 2-chloro-1,3,2-dioxaborepane, acetone and trimethyl phosphite, the product is 2-[2-(dimethoxyphosphinyl)propoxy]-1,3,2-dioxaborepane:

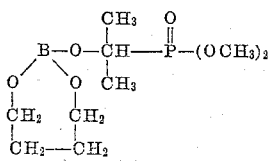

Using the appropriate halogenated dioxa ring compound of boron, the appropriate carbonyl compound, and the appropriate triorgano phosphite, the following compounds, e.g., are obtained according to the invention:

2 - [1 - (di - n - hexyloxyphosphinyl)methoxy] - 1,3,2-dioxaborolane

2-[α - (didodecyloxyphosphinyl) - 2,4 - dichlorobenzyloxy]-4,4-dimethyl-1,3,2-dioxaborolane 2 - [3 - (dipropyloxyphosphinyl)pentyloxy] - 5,6-dibutyl-1,3,2-dioxaborepane 2 - [1 - (diisobutyloxyphosphinyl)dodecyloxy] - 4 - ethyl-1,3,2-dioxaborinane 2 - [α - (dipentyloxyphosphinyl)furfuryloxy] - 4,5 - diisopropyl-1,3,2-dioxaborinane 2 - [1 - (dimethoxyphosphinyl) - 2,2,2 - trichloroethoxy]-1,3,2-dioxaborolane Instead of using phosphites in the reaction with the mono-halo boron compound and the carbonyl compound, there may be employed esters of hydrocarbylphosphonous acids or esters of dihydrocarbylphosphinous acids. Thus, the reaction of chlorodibutyl borane, acetaldehyde and dimethyl propylphosphonite gives 1-(methoxypropylphosphinyl)ether dibutyl borinate, i.e.,

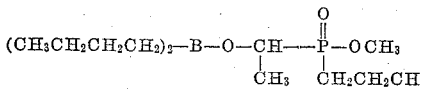

Reaction of bromodiethoxyborane, 2-butanone and ethyl diphenylphosphinite gives diethyl 2-(diphenylphosphinyl) butyl borate, i.e.,

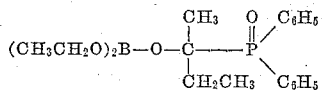

The compounds generally obtained from the mono-halo borons using the phosphonites or phosphinites instead of the phosphites have the general formula

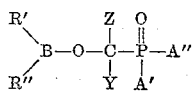

Further examples of such compounds are given in the table below:

| R′, R″= | Z= | Y= | A′= | A″= |
|---|---|---|---|---|
| propyl | H | furyl | ethyl | ethoxy |
| α-naphthyl | H | phenyl | butyl | butyl |
| allyl | H | ethyl | phenyl | 2-chloroethoxy |
| p-tolylthio | | cyclohexyl | propyl | n-octyl |
| cyclohexyl | H | methyl | cyclohexyl | ethoxy |
| phenoxy | H | methyl | phenyl | methoxy |
| 2-chloroethyl | H | phenyl | p-tolyl | p-tolyl |
| 2-chlorolvinyl | H | 3-cyanopropyl | benzyl | dodecyl |
| benzyl | methyl | heptyl | pentyl | decyloxy |
| 2-propynyl | propyl | dodecyl | hexyl | ethyl |
| p-ethylphenyl | H | α-naphthyl | ethyl | butoxy |
| dodecyl | methyl | 2-ethoxybutyl | phenyl | phenyl |
| ethoxy | H | piperonyl | isopropyl | methoxy |
| dichlorophenyl | H | carbomethoxypropyl | phenyl | phenyl |

Nitrogenous boron halides are likewise very useful in the present process.

Reaction of dialkylaminodihaloboranes with formaldehyde and a trialkyl phosphite or a tris(haloalkyl) phosphite yields dialkylamino bis[(dialkoxyphosphinyl)methoxy]boranes when a trialkyl phosphite is used or dialkylamino bis{[bis(haloalkoxy)phosphinyl]methoxy}boranes when a tris(haloalkyl) phosphite is used, i.e., compounds of the formula

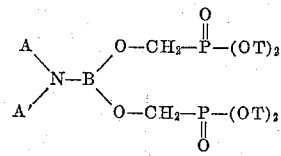

wherein A and A′ are alkyl radicals of from 1 to 5 carbon atoms, and T is selected from the class consisting of alkyl and halogen-substituted alkyl radicals of from 1 to 12 carbon atoms. Thus, from dichloromethylpropylaminoborane and substantially two moles each of formaldehyde and of trimethyl phosphite there is obtained bis[(dimethoxyphosphinyl)methoxy] methylpropylaminoborane, i.e., a compound of the formula in which A is methyl, A′ is propyl and T is methyl. Similarly, from dichlorodiethylaminoborane, formaldehyde and tris(2-chloroethyl) phosphite there is obtained bis{bis(2 - chloroethoxy)phosphinyl]methoxy}diethylaminoborane.

The reaction of a dialkylaminodihaloborane with an alkanecarboxaldehyde and a trialkyl or tris(haloalkyl) phosphite gives either bis[1-(dialkoxyphosphinyl)alkoxy] dialkylaminoboranes or bis{1-[bis(haloalkoxy)phosphinyl]alkoxy}dialkylaminoboranes, depending upon whether a trialkyl phosphite or a tris(haloalkyl) phosphite is used, i.e., the products thus obtained have the formula

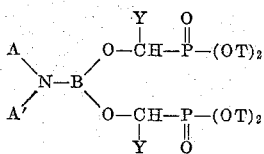

where A and A′ are alkyl radicals of from 1 to 5 carbon atoms, Y is an alkyl radical of from 1 to 12 carbon atoms and T is an alkyl radical or haloalkyl radical of from 1 to 12 carbon atoms. Thus, the reaction product of dichloroethylpentylaminoborane, acetaldehyde and tri-n-propyl phosphite gives a compound in which A of the above formula is ethyl, A′ is pentyl, Y is methyl and T is propyl, i.e., bis[1-(dipropoxyphosphinyl)ethoxy]ethylpentylaminoborane. Other compounds prepared according to the present process from a dialkylaminodichloroborane or a dialkylaminodibromoborane, an alkanecarboxaldehyde and a trialkyl or tris(haloalkyl) phosphite are as follows:

Bis[1 - (dimethoxyphosphinyl)propoxy]dimethylaminoborane

Bis[1-(diethoxyphosphinyl)ethoxy]diethylaminoborane

Bis[1 - (diethoxyphosphinyl) - 2 - ethylhexyloxy]methylpropylaminoborane

Bis[1 - (dihexyloxyphosphinyl)ethoxy]di - n - butylaminoborane

Bis{1 - [bis(2 - bromoethoxy)phosphinyl]dodecyloxy} ethylpentylaminoborane

Bis{1 - [bis(2 - chloropropoxy)phosphinyl]butoxy}di - n-pentylaminoborane

Bis{1 - [bis(2 - ethylhexyloxy)phosphinyl]propoxy}diisopentylaminoborane

Bis{1 - [bis(2 - iodoethoxy)phosphinyl]ethoxy}dimethylaminoborane

Bis[1-(diethoxyphosphinyl)ethoxy]dimethylaminoborane

Bis{1 - [bis(2 - chloropropoxy)phosphinyl] - 2 - methylpropoxy}di-n-propylaminoborane Bis{1 - [bis(2 - chloroethoxy)phosphinyl]butoxy}dibutylaminoborane Employing a benzenoid carboxaldehyde with the dialkylaminohaloborane and a trialkyl phosphite yields the bis[1 - (dialkoxyphosphinyl)aralkyloxy]dialkylaminoboranes, i.e., compounds of the formula

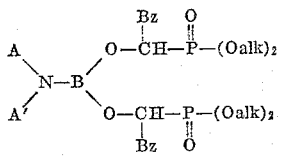

in which A and A' are the alkyl radicals defined above, Bz denotes a benzenoid radical free of aliphatic unsaturation and containing from 6 to 11 carbon atoms and alk denotes an alkyl radical of from 1 to 12 carbon atoms. Thus, dichloromethylpropylaminoborane, benzaldehyde and trimethyl phosphite give bis[α-(dimethoxyphosphinyl) benzyloxy] methylpropylaminoborane; dichlorodi-n-propylaminoborane, p-tolualdehyde and tris(2-chloroethyl) phosphite gives bis{α-[bis(2-chloroethoxy)phosphinyl] - p - methylbenzyloxy}di - n - propylaminoborane; dibromodimethylaminoborane, phenylacetaldehyde and triethyl phosphite gives bis[1-(diethoxyphosphinyl) - 2 - phenylethoxy]dimethylaminoborane; dichlorodiethylaminoborane, o-tolualdehyde and tri-n-butyl phosphite gives bis[α-(di-n-butoxyphosphinyl)-o-methylbenzyloxy]diethylaminoborane; dichloroethylpropylaminoborane, benzaldehyde and tetrachlorododecyl phosphite gives bis{α-[bis(tetrachlorododecyloxy)phosphinyl) benzyloxy} ethylpropylaminoborane; dichlorodipentylaminoborane, p-ethylbenzaldehyde and triethyl phosphite gives bis[α-(diethoxyphosphinyl)-p-ethylbenzyloxy] dipentylaminoborane; dibromodibutyl aminoborane, benzaldehyde and tris(2-bromoethyl) phosphite gives bis{α - [bis(2 - bromoethoxy)phosphinyl]benzyloxy}dibutylaminoborane; dichlorodimethylaminoborane, o-tolualdehyde and tris(2-fluoroethyl)phosphite gives bis{α - [bis(2 - fluoroethoxy)phosphinyl] - o - methylbenzyloxy}dimethylaminoborane, etc.

When the nitrogenous dihaloborane compound is an N-heterocyclic borane, e.g., dichloropiperidino or pyrrolidinoborane, the products with formaldehyde and the triorgano phosphite are bis[(dialkoxyphosphinyl)methyl] or bis{[bis(haloalkoxy)phosphinyl]methoxy}piperidino- or pyrrolidinoboranes, i.e., compounds of the formula

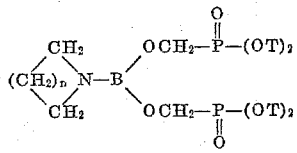

in which n is an integer of 2 or 3 and T is selected from the class consisting of alkyl and haloalkyl radicals of from 1 to 12 carbon atoms. Thus, dichloropiperidinoborane, formaldehyde and triethyl phosphite or tris(2-chloroethyl) phosphite yield either the bis[(diethoxyphosphinyl)methoxy] or the bis{[bis(2-chloroethoxy)phosphinyl]methoxy}piperidinoborane; and dichloropyrrolidinoborane, formaldehyde and tri-n-octyl phosphite or tris(2-chloropropyl) phosphite give either the bis[(di-n-octyloxyphosphinyl)methoxy] or the bis{[bis(2-chloropropoxy)phosphinyl]methoxy}pyrrolidinoborane. Other dihalo-N-heterocyclic boranes, e.g., aziridino-, 2-methylaziridino-, azetidino-, or morpholinodichloro- or dibromoboranes react in the same manner.

Employing a hydrocarbon carboxaldehyde with the triorgano phosphite and N-heterocyclic boron dihalide in the present process there are obtained with the aziridino-, azetidino-, pyrrolidino-, or piperidinodihaloboranes of the formula

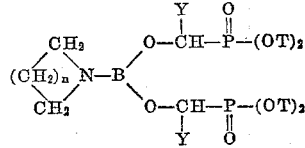

wherein n is an integer of 0 to 3, Y is a hydrocarbyl radical which is free of aliphatic unsaturation and contains from 1 to 12 carbon atoms, and T is selected from the class consisting of alkyl and haloalkyl radicals of from 1 to 12 carbon atoms, i.e., there are provided either the bis[1-(dialkoxyphosphinyl)hydrocarbyloxy] or the bis{1 - [bis(haloalkoxy)phosphinyl]hydrocarbyloxy}piperidinoboranes, or pyrrolidinoboranes, or azetidinoboranes, or aziridinoboranes. Thus, the reaction of dichloropiperidinoborane, acetaldehyde and triethyl phosphite gives bis[1 - (diethoxyphosphinyl)ethoxy]piperidinoborane; dibromoaziridinoborane, benzaldehyde and triisooctyl phosphite gives bis[α-(diisooctyloxyphosphinyl)benzyloxy]aziridinoborane; tris(2 - chloroethyl) phosphite, butyraldehyde and dichloroazetidinoborane gives bis{1 - [bis(2 - chloroethoxy)phosphinyl]butoxy} azetidinoborane; trimethyl phosphite, octanal and dichloropyrrolidinoborane gives bis[1 - (dimethoxyphosphinyl)octyloxy]pyrrolidinoborane; tri-n-butyl phosphite, p - tolualdehyde and dichloropyrrolidinoborane gives bis[α - (di - n - butoxyphosphinyl) - p - methylbenzyloxy]pyrrolidinoborane; and tris(2-chloroethyl) phosphite, acetaldehyde and dichloro-2-methylaziridinoborane gives bis{1-[bis(2-chloroethoxy)phosphinyl]ethoxy} aziridinoborane.

When the boron compound is morpholinodihaloborane the products prepared according to the invention from a hydrocarbon carboxaldehyde and a triorgano phosphite such as a trialkyl phosphite are bis[1-(dialkoxyphosphinyl)alkyloxy]morpholinoboranes of the formula

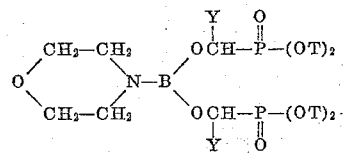

wherein Y is a hydrocarbon radical free of aliphatic unsaturation and containing from 1 to 11 carbon atoms and T is an alkyl radical of from 1 to 12 carbon atoms. Thus, the reaction of dichloromorpholinoborane with acetaldehyde and triethyl phosphite gives bis-[1-(diethoxyphosphinyl)ethoxy]morpholinoborane; with benzaldehyde and tributyl phosphite said dichloro compound gives bis[α-(dibutoxyphosphenyl)benzlyoxy]morpholinoborane.

The nitrogenous boron compounds react with a carbonyl compound and a phosphonite or a phosphinite instead of a phosphite. Thus, reaction of dichloropiperidinoborane, acetaldehyde and diethyl phenylphosphonite gives bis[1-(ethoxyphenylphosphinyl)ethoxy]piperidinoborane

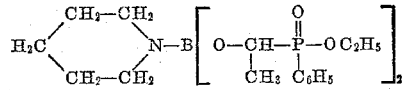

and the reaction of dichlorodimethylaminoborane, acetone and methyl diethylphosphinite gives bis[2-(diethylphosphinyl)propoxy]dimethylaminoborane:

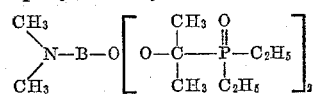

Reaction of the halogen-containing boron compound, the carbonyl compound and the phosphorus ester takes place readily by mixing together the three reactants at ordinary, decreased, or increased temperatures and allowing the resulting reaction mixture to stand until formation of the phosphinyl boron compound. In a continuous process, one of the three reactants, preferably, the haloboron compound, is added to the mixture of the carbonyl compound and the phosphorous ester. Because the reaction may be exothermic, gradual contact of the reactants is usually recommended in order to obtain smooth reaction. However, as will be apparent to those skilled in the art, the exothermal nature of the reaction becomes less of a factor as the molecular weight of the reactants, and particularly of the triorgano phosphorous ester, is increased. Also, when the aldehyde is either a higher alkanecarboxaldehyde or an aralkyl or alkaryl aldehyde, reaction is generally not so rapid as it is with the lower aliphatic aldehydes or with benzaldehyde. It is thus recommended that in each initial run, the three reactants be mixed gradually at low temperatures and that external heating be employed only when there appears no spontaneous increase in temperature as a consequence of the mixing. In most instances, the reaction is mildly exothermic initially. Whether the reaction goes to completion without the use of extraneous heat is determined by the nature of the reactants. Completion of the reaction, in any event, can be readily ascertained by noting cessation in change of viscosity, refractive index, or the quantity of by-product alkyl or haloalkyl halide. Using the lower alkanecarboxaldehydes, which aldehydes are generally very reactive, external cooling is usually advantageous. When working with such active aldehydes, optimum conditions comprise gradual addition of the halo-boron compound to a mixture of the other two reactants with application of external cooling and thorough stirring. Usually it suffices to maintain the reaction temperature at, say, from minus 25° C. to 50° C. during addition of the aldehyde. When all of the aldehyde has been added to said mixture and there is no longer any evidence of exothermic reaction, completion of the reaction may be assured by heating the reaction mixture to a temperature of from, say, 50° C. to 150° C. With the more sluggish aldehydes, it may be necessary to heat the reaction mixture moderately before an exothermic reaction is initiated. Employing a high molecular weight phosphorus ester and halo-boron compound, even higher temperatures may be required.

The reactants are advantageously employed in stoichiometric proportions, i.e., one mole of the halo-boron compound and substantially one mole each of the carbonylic compound and of the triorgano phosphorous ester per halogen atom present in said halo-boron compound. Thus with a boron compound such as boron trichloride there are advantageously used three moles each of the carbonyl compound and of the phosphorus ester with a dihalide, e.g., an alkyl dichloroborane, there are used two moles each of the carbonyl compound and of the phosphorus ester; and with a monohalide, e.g., a diarylchloroborane, there are used one mole each of the carbonyl compound and of the phosphorus ester. While, as will be appreciated by those skilled in the art, said stoichiometric proportions are advantageously employed in that thereby good yields of desired product result and there arises substantially no problem of separating any excess reactant or reactants, the carbonyl compound and the phosphorus ester may be present in excess with respect to said boron halogen compound.

Formation of the desired product, i.e., the phosphinyl boron compound, is accompanied by the formation of a halogenated alkane as a by-product. Thus, the reaction of, say, daryloxy-chloroborane, acetaldehyde and triethyl phosphite gives ethyl chloride as a by-product:

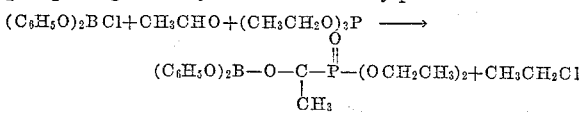

The by-product halogated alkane thus consists of one of the alkyl or haloalkyl radicals of the trialkyl or tris-(haloalkyl) phosphite used plus the halogen atom present in the initially employed halo-boron compound. This by-product is readily removed from the desired product by volatilization. The by-product halogenated alkanes are generally articles of commerce for which many applications exist. Also, for many purposes a solution of the phosphinyl boron compound in the haloalkane may be used directly for a variety of industrial and agricultural applications, e.g., as a gasoline additive or a nematocide.

The process of the present invention is readily conducted in the absence of an inert diluent or catalyst. However, catalysts and diluents or solvents may be employed. The use of diluents may be particularly advantageous when working with the high active aldehydes; such diluents may be, e.g., benzene, toluene, dioxane, methylene chloride, or hexane. Although no particular order of adding the reactants to each other need be observed, the reaction is preferably carried out by adding the boron halide reactant to a solution of the carbonyl compound and the trivalent phosphorus ester. However, the reaction may also be conducted, e.g., in the case of the α-halocarbonyl compounds, by mixing the halo-boron compound with the carbonyl compound at a low temperature, and then adding the phosphorus ester. Advantageously, when using boron trichloride or boron tribromide as the boron component, the activity thereof may be moderated by first preparing an ether complex thereof and employing said complex instead of the trihalide. The ether complexes are formed by simply passing the trihalide into an excess of anhydrous ether, whereby there is formed an ether solution of the complex. Said solution, without isolation of the complex, can then be added to a mixture of the carbonyl compound and the trivalent phosphorus ester. As examples of ethers which are useful for this purpose are ethyl or propyl ether, dioxane, tetrahydrofuran, etc.

An alternative method for the preparation of the present compounds comprises reaction of a halogenated boron compound with an ester of an α-hydroxyphosphonic acid. Thus, reaction of, say, an alkoxydihaloborane with such an ester proceeds as follows:

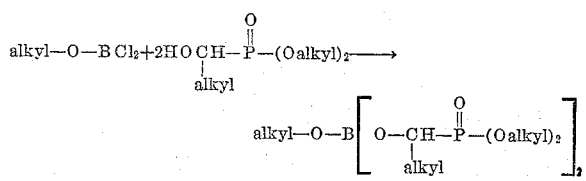

Reaction with a boron trihalide results in similar replacement of three, rather than two, halogen atoms; and in the case of a mono-halo-boron compound there is, of course, replacement of only the one halogen atom. The boron halide may be boron trichloride or tribromide, or a compound of the formula $RBX_2$ $R_2BX$ where X is chlorine or bromine and R is selected from the class consisting of hydrocarbyl, halohydrocarbyl, hydrocarbyloxy, hydrocarbylthio, halohydrocarbyloxy and halohydrocarbylthio radicals of from 1 to 12 carbon atoms. The hydroxy phosphonate may be any compound of the general formula

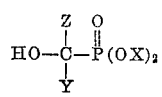

wherein Y is selected from the class consisting of hydrogen and the radicals: alkyl of from 1 to 12 carbon atoms, furyl, thienyl and benzenoid hydrocarbon which are free of aliphatic unsaturation and contain from 6 to 12 carbon atoms; and said radicals carrying a substituent selected from the class consisting of halogen, cyano, methylenedioxy, alkyl, —O-alkyl and —COOalkyl where the alkyl radical has from 1 to 5 carbon atoms; Z is selected from the class consisting of hydrogen and alkyl radicals of from 1 to 3 carbon atoms; and T is selected from the class consisting of alkyl and haloalkyl radicals of from 1 to 12 carbon atoms.

While, as will be seen from Examples 3 and 5 hereinafter, reaction of the halo-boron compound and the hydroxy phosphonate proceeds quite readily to give the phosphinyl boron compounds, the latter are obtained in much better yields when using as reactants a halo-boron compound, a carbonyl compound, and a trivalent phosphorus ester. While reaction of the dialkyl phosphites and a carbonyl compound gives hydroxy phosphonates by an addition reaction

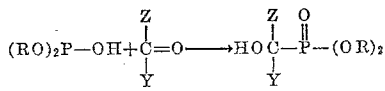

the hydroxy phosphonates are not obtained when the dialkyl phosphite is replaced by a trialkyl phosphite.

The phosphinyl boron compounds of the present invention are stable, usually high-boiling materials which range from viscid liquids to waxy or crystalline solids. They are advantageously used as biological toxicants, e.g., as insecticides, fungicides, nematocides and bacteriostats; as hydrocarbon oil lubricants and gasoline additives; as functional fluids, e.g., in force-transmission media and dielectric applications; as plasticizers for synthetic resins and plastics; as rubber-compounding chemicals; and as flame-proofing agents for cellulosic and carbonaceous combustible materials in general, e.g., surface coatings, lacquers, polymers, resins and adhesives.

Those of the presently provided phosphinyl boron compounds which are gasoline-soluble are particularly useful as preignition additives for leaded gasolines. The invention thus provides an improved fuel for spark ignition internal combustion engines which consists essentially of gasoline, an organo lead anti-knock and a gasoline-soluble phosphinyl boron ester, said ester being present in said fuel in a quantity sufficient to suppress preignition of the fuel and sparkplug fouling.

Preignition is the ignition of the combustible mixture of air and fuel prior to firing by the sparkplug. This occurs when deposits of readily glowing material build up in the combustion chamber. When the fuel is a gasoline containing an organolead anti-knock together with a halohydrocarbon scavenger, such readily glowing deposits comprise carbon in a mixture with lead halides; the latter acting to reduce the normal ignition temperature of carbon. Since reduction of the ignition temperature tends to increase with increasing concentration of the organolead anti-knock, preignition is a problem which becomes particularly troublesome as use of high compression engines become more prevalent. The deposits of carbon and lead salt retain sufficient heat from the previous firing cycle in sufficient quantity to permit them to glow, and if the glowing period (which depends on ease of ignition, and hence the lead content of the deposit) is long enough, the fuel is fired in the next cycle before it can be fired by the spark plug. The erratic firing which thus results is demonstrated by a "wild ping" or a dull, thudding knock. It is generally accompanied by increased detonation, spark-plug fouling, and reduction of exhaust valve life.

It has now been found that preignition and the various difficulties consequent thereto can be substantially suppressed or entirely eliminated by incorporating into the leaded gasoline a phosphinyl boron compound which is soluble in said gasoline in a preignition-inhibiting quantity. Such a quantity, of course, will depend upon the content of organolead compound and halo-hydrocarbon scavenger in the fuel. Leaded gasolines usually contain an anti-knocking quantity of an organolead compound such as tetraethyllead, tetramethyllead, dimethyldiethyllead, and tetraphenyllead and substantially the amount of hydrocarbon halide scavenger, say, ethylene dibromide, ethylene dichloride, acetylene tetrabromide, or mono- or polyhalopropane, butane, or pentane, or polyhaloalkyl benzene, which is calculated to react with the organolead compound to give a lead halide, e.g., lead bromide when the organolead compound is tetraethyllead and the halohydrocarbon is ethylene dibromide. The quantity of the present phosphinyl boron compound which will suppress preignition of the leaded hydrocarbon fuel will depend upon the quantity of lead present in the fuel and will vary from, say, 0.05 to 10.0 moles of said ester per atom of lead present in said fuel.

The present invention is illustrated by, but not limited to, by the following examples:

Example 1

To a cooled (5° C.) mixture consisting of 32.8 g. (0.197 mole) of triethyl phosphite and 11.4 g. (0.197 mole) of propionaldehyde there was added, dropwise during 10 minutes, 32.0 g. (0.197 mole) of 4,4,6-trimethyl-2-chloro-1,3,2-dioxaborinane at a temperature of 15–20° C. When the very vigorous reaction had subsided, ice-cooling was discontinued, the mixture was allowed to attain room temperature, and finally heated to 50° C. to assure complete reaction. The whole was then placed under water-pump vacuum to remove by-product ethyl chloride. Concentration to 100° C./0.1 mm. gave as residue 62 g. (97.7% theoretical yield) of the substantially pure 2-[1-(diethoxyphosphinyl)propoxy]-4,4,6-trimethyl-1,3,2-dioxaborinane, $n_D^{25}$ 1.4346, and analyzing as follows:

| | Found | Calcd. for $C_{13}H_{28}O_5BP$ |
|---|---|---|
| Percent C | 48.21 | 48.57 |
| Percent H | 8.17 | 8.76 |
| Percent B | 3.15 | 3.36 |
| Percent P | 9.79 | 9.62 |

Example 2

To a mixture consisting of 136.8 g. (0.822 mole) of triethyl phosphite and 47.8 g. (0.822 mole) of propionaldehyde there was added a solution consisting of 122 g. (0.822 mole) of 2-chloro-5,5-dimethyl-1,3,2-dioxaborinane in 100 ml. of benzene during 0.5 hour at 22–28° C. throughout the addition, an ice-brine bath was used for cooling. The whole was heated to 70° C., subjected to water-pump vacuum and heated to 80° C., and finally concentrated to 100° C./0.8 mm. There was thus obtained as residue 252 g. (99.3% theoretical yield) of the substantially pure 2-[1-(diethoxyphosphinyl)propoxy]-5,5-dimethyl-1,3,2-dioxaborinane, which upon distillation gave a colorless product, B.P. 128–130° C./0.1–0.15 mm., $n_D^{25}$ 1.4415, which analyzed as follows:

| | Found | Calcd. for $C_{13}H_{28}O_5BP$ |
|---|---|---|
| Percent C | 46.78 | 46.78 |
| Percent H | 8.50 | 8.51 |
| Percent P | 9.79 | 10.04 |
| Percent B | 3.48 | 3.52 |

Example 3

To 58.6 g. (0.298 mole) of diethyl 1-hydroxypropylphosphonate in 50 ml. of methylene dichloride cooled to 2° C. there was added, dropwise during 0.25 hour, 44.3 g. (0.298 mole) of 2-chloro-5,5-dimethyl-1,3,2-dioxaborinane. By the time all of the borinane compound had been added the temperature of the reaction mixture had risen spontaneously to 40° C. The whole was then placed under water-pump vacuum, heated to 80° C. in order to remove the solvent and by-product hydrogen chloride, and distilled twice to give substantially pure 2-[1-diethoxyphosphinyl)propoxy] - 5,5 - dimethyl - 1,3,2 - dioxaborinane, B.P. 128–131° C./0.0.5–0.1 mm., $n_D^{25}$ 1.4419, and analyzing 3.78% B as against 3.52% B, the theoretical value.

Example 4

To a mixture consisting of 124.8 g. (0.75 mole) of triethyl phosphite and 35 g. (0.75 mole+2 g. excess) of acetaldehyde, cooled to 2° C., there was added, dropwise during 0.5 hour at 15–20° C., a substantially equimolar quantity of a benzene solution of 2-bromo-5,5-dimethyl- 1,3,2-dioxaborinane, while maintaining the reaction temperature at 15–25° C. by means of ice-cooling. The whole was then stirred for one hour at room temperature and subsequently placed under water-pump vacuum and warmed to 60° C. to remove solvent and any unreacted material and/or by-product. Distillation of the residue gave 36.7 g. of product which upon redistillation gave substantially pure 2-[1-diethoxyphosphinyl)ethoxy]-5,5-dimethyl-1,3,2-dioxaborinane, B.P., 111–114° C./0.05 mm., $n_D^{25}$ 1.4400, which analyzed as follows:

|           | Found | Calcd. for $C_{11}H_{24}O_6BP$ |
|-----------|-------|-------|
| Percent C | 45.06 | 44.97 |
| Percent H | 8.15  | 8.22  |
| Percent B | 3.67  | 3.68  |
| Percent P | 10.42 | 10.51 |

Example 5

To a mixture consisting of 74.8 g. (0.41 mole) of diethyl 1-hydroxyethylphosphonate, 32.5 g. (0.41 mole) of pyridine and 150 ml. of anhydrous ethyl ether cooled to 6° C., there was added, dropwise during 0.3 hour, a substantially equimolar quantity of a benzene solution of 2-bromo-5,5-dimethyl-1,3,2-dioxaborinane while maintaining the temperature of the reaction mixture at 12–16° C. by means of ice-cooling. When all of the borinane compound had been added, ice-cooling was discontinued and the whole heated to reflux (52° C.) to insure complete reaction. The resulting mixture was then cooled to 10° C., filtered, the filtrate placed under water-pump vacuum and heated to 50° C. to remove solvent. Distillation of the residue gave a fraction, B.P. 130–135° C./0.2–2.1 mm. which, upon twice repeated distillation, gave the substantially pure 2-[1-(diethoxyphosphinyl)ethoxy]-5,5-dimethyl-1,3,2-dioxaborinane, B.P. 113–114° C./0.05 mm., $n_D^{25}$ 1.4401 which analyzed as follows:

|           | Found | Calcd. for $C_{11}H_{24}O_6BP$ |
|-----------|-------|-------|
| Percent C | 45.07 | 44.97 |
| Percent H | 8.01  | 8.22  |
| Percent B | 3.61  | 3.68  |
| Percent P | 10.29 | 10.51 |

Example 6

To a mixture consisting of 29.9 g. (0.180 mole) of triethyl phosphite and 16.9 g. (0.176 mole) of furfural there was added 28.6 g. (0.176 mole) of 2-chloro-5-methyl-5-ethyl-1,3,2-dioxaborinane during 0.2 hour at 5–15° C. The reaction mixture was then warmed to 40° C. and concentrated to a pot temperature of 80° C./0.3 mm. to give as residue 63.1 g. (99% theoretical yield) of the substantially pure 2-[α-(diethoxyphosphinyl)furfuryloxy]-5-ethyl-5-methyl-1,3,2-dioxaborinane, $n_D^{25}$ 1.4727, which analyzed 2.84% boron as against 2.99%, the calculated value.

Example 7

2-chloro-5-ethyl-5-methyl-1,3,2-dioxaborinane (35.7 g., 0.22 mole) was added, dropwise during 0.45 hour, to a mixture consisting of 21.6 g. (0.22 mole) of cyclohexanone and 36.6 g. (0.22 mole) of triethyl phosphite while maintaining the temperature of the reaction mixture at 10–15° C. by means of an ice bath. The whole was then heated to 45° C. to insure complete reaction and finally concentrated to 107° C./0.7 mm. to give as residue 78.9 g. (99% theoretical yield) of the substantially pure 2-[1-(diethoxyphosphinyl)cyclohexyloxy] - 5 - ethyl - 5 - methyl-1,3,2-dioxaborinane, $n_D^{25}$ 1.4651.

Example 8

To a mixture consisting of 64.9 g. (0.521 mole) of triethyl phosphite and 32.8 g. (0.564 mole) of propionaldehyde there was added, with cooling, 70.3 g. (0.508 mole) of 2-chloro-4-methyl-1,3,2-dioxaborinane during 0.35 hour while maintaining the temperature of the reaction mixture at 15–22° C. by means of an ice bath. The whole was then stirred at room temperature until there was no further indication of an exothermal reaction and the mixture subsequently subjected to water-pump vacuum to remove by-product methyl chloride. Concentration of the residue to 87° C./1.5 mm. gave as residue 134.3 g. (99.3% theoretical yield) of the substantially pure 2-[1-(dimethoxyphosphinyl)propoxy]-4-methyl-1,3,2-dioxaborinane, $n_D^{25}$ 1.4420.

Example 9

2-chloro-5-ethyl-5-methyl-1,3,2-dioxaborinane (21.5 g., 0.132 mole) was added, dropwise during 0.1 hour, to a mixture consisting of 22.1 g. (0.132 mole) of triethyl phosphite and 18.6 g. (0.132 mole) of 2-chlorobenzaldehyde while maintaining the temperature of the reaction mixture at 15–20° C. by means of ice-cooling. The whole was then heated to 60° C. to insure complete reaction, placed under water-pump vacuum and heated to 70° C. to remove by-product, and finally concentrated to 115° C./1.0 mm. to obtain as residue the substantially pure 2 - [α-(diethoxyphosphinyl)-2-chlorobenzyloxy]-5-ethyl-5-methyl-1,3,2-dioxaborinane, $n_D^{25}$ 1.4952.

Example 10

To a mixture consisting of 110.2 g. (0.663 mole) of triethyl phosphite and 38.6 g. (0.663 mole) of propionaldehyde there was added, dropwise during 0.5 hour, a substantially equimolar quantity of 2-chloro-5-ethyl-4-propyl-1,3,2-dioxaborinane while maintaining the temperature of the reaction mixture at 22–27° C. by means of ice-cooling. The whole was then heated to 75° C. to insure complete reaction, subjected to water-pump vacuum and warmed to 75° C. and finally concentrated to 95° C./1.0 mm. to obtain as residue 235 g. of the substantially pure 2-[1-(diethoxyphosphinyl)propoxy]-5-ethyl - 4 - propyl-1,3,2-dioxaborinane, $n_D^{25}$ 1.4413.

Example 11

2-chloro-1,3,2-dioxaborinane (30.7 g., 0.255 mole) was added during 10 minutes to a mixture consisting of 33.2 g. (0.255 mole) of ethyl 3-formylpropionate and 31.7 g. (0.255 mole) of trimethyl phosphite while maintaining the temperature at 20–30° C. by means of an ice bath. The whole was then stirred until no further evidence of exothermic reaction and then placed under water-pump vacuum to remove by-product methyl chloride. Concentration of the remainder to 100° C./2.0 mm. gave as residue 69.4 g. (93% theoretical yield) of the substantially pure 2-[1-(dimethoxyphosphinyl)-3-carboethoxypropoxy]-1,3,2-dioxaborinane, $n_D^{25}$ 1.4521.

Example 12

To a mixture consisting of 70.5 g. (0.585 mole) of acetophenone and 72.6 g. (0.585 mole) of trimethyl phosphite there was added, dropwise during 20 minutes, a substantially equimolar quantity of 2-chloro-4-methyl-1,3,2-dioxaborinane while maintaining the temperature of the reaction mixture at 20–30° C. by means of ice-cooling. The whole was then stirred at room temperature, placed under water-pump vacuum, heated to 65° C. to remove the by-product and finally concentrated to 80° C./0.25 mm. There was thus obtained as residue 179.6 g. (94% theoretical yield) of the substantially pure 2-[α-(dimethoxyphosphinyl)-α-methylbenzyloxy]-4-methyl - 1,3,2 - dioxaborinane, $n_D^{25}$ 1.5048.

Example 13

To a mixture consisting of 111.2 g. (0.669 mole) of triethyl phosphite and 39.0 g. (0.669 mole) of propionaldehyde there was added, dropwise during 0.3 hour, 90 g. (0.669 mole) of 2-chloro-4-methyl-1,3,2-dioxaborinane at a temperature of 20–28° C. The whole was then heated to 60° C. to insure complete reaction and subsequently to 80° C. under water-pump vacuum to remove by-product. Concentration of the remainder to 85° C./1.0 mm. gave as residue 197.7 g. (100% theoretical yield) of the substantially pure 2-[1-(diethoxyphosphinyl)propoxy]-4-methyl-1,3,2-dioxaborinane, $n_D^{25}$ 1.4372.

*Example 14*

Triethyl phosphite (91.3 g., 0.55 mole) and 34.8 g. (0.60 mole) of acetone were placed in a 500 cc. flask and stirred and cooled as 53 g. (0.50 mole) of 2-chloro-1,3,2-dioxaborolane in 75 ml. of methylene dichloride was added in 0.3 hour at a temperature of 10–15° C. The whole was then allowed to attain 20° C. and distilled to remove material boiling below 110° C./0.6 mm. There was thus obtained as residue the substantially pure 2-[2-(diethoxyphosphinyl)-2-propoxy]-1,3,2-dioxaborolane.

*Example 15*

A solution of 30.3 g. (0.19 mole) of 2-chloro-5-ethyl-5-methyl-1,3,2-dioxaborinane in 75 ml. of hexane was cooled to −79° C., and 28.0 g. (0.19 mole) of anhydrous chloral was added thereto during 0.2 hour while cooling with Dry Ice. The reaction mixture was then allowed to warm to 10° C., and 24.8 g. (0.20 mole) of trimethyl phosphite was added during 0.2 hour while maintaining the temperature of the reaction mixture at 5–15° C. When cooling was discontinued, the temperature of the reaction mixture increased spontaneously to a maximum of 34° C. The whole was then refluxed at 55–60° C. for 0.5 hour and concentrated to a pot temperature of 94° C./0.4 mm. to give as residue 68.9 g. (97% theoretical yield) of the substantially pure 2-[1-(diethoxyphosphinyl)-2,2,2-trichloroethoxy]-5-ethyl - 5 - methyl-1,3,2-dioxaborinane, $n_D^{25}$ 1.4770 which analyzed 2.72% boron and 26.51% chlorine as against 2.82% and 27.7%, the calculated values.

*Example 16*

To a mixture consisting of 33.2 g. (0.20 mole) of triethyl phosphite and 21.6 g. of p-tolualdehyde, there was gradually added, with cooling, 28.8 g. (0.177 mole) of 2-chloro-5-ethyl-5-methyl-1,3,2-dioxaborinane during 0.2 hour at a temperature of 10–15° C. The reaction mixture was then warmed to 40° C. at water-pump pressure and then concentrated to 102° C./0.15 mm. in order to remove unreacted material and the by-product ethyl chloride. There was thus obtained as residue 69.4 g. of the substantially pure 2 - [α-(diethoxyphosphinyl)-4-methylbenzyloxy]-5-ethyl-5-methyl-1,3,2 - dioxaborinane, $n_D^{25}$ 1.4913, which analyzed 2.64% boron as against 2.82%, the calculated value.

*Example 17*

A methylene dichloride solution of 2-chloro-1,3,2-dioxaborinane was prepared by adding, dropwise, a solution consisting of 80.9 g. (0.218 mole) of tri-1,3-propanediol diborate in 75 ml. of methylene dichloride to a solution of 25.6 g. (0.218 mole) of boron trichloride in 75 ml. of methylene dichloride at a temperature of −5° C. to 5° C. The methylene dichloride solution of the 2-chloro-1,3,2-dioxaborinane thus obtained was gradually added, during a time of 30 minutes, to a mixture consisting of 109.6 g. (0.655 mole) of triethyl phosphite and 38.2 g. (0.655 mole) of acetone, while maintaining the temperature at 13–20° C. by means of ice-cooling. When addition was completed, the whole was heated to reflux, placed under water-pump vacuum and heated to 50° C. to remove the solvent and the by-product ethyl chloride. Concentration to 85° C./0.7 mm. gave as residue 185 g. of the substantially pure 2-[2-(diethoxyphosphinyl)propoxy]-1,3,2-dioxaborinane, $n_D^{25}$ 1.4438, and analyzing as follows:

|  | Found | Calcd. for $C_{10}H_{22}O_5BP$ |
|---|---|---|
| Percent C | 41.75 | 42.90 |
| Percent H | 7.40 | 7.97 |
| Percent B | 4.00 | 3.86 |

*Example 18*

Boron trichloride was passed into 125 ml. of anhydrous ether until 19.3 g. (0.165 mole) had been absorbed. The whole was then added to a solution of 95.8 g. (0.575 mole) of triethyl phosphite and 32 g. (0.73 mole) of acetaldehyde with cooling at 10–25° C. during a time of 0.3 hour. When cooling was discontinued, the temperature of the reaction mixture increased spontaneously to reflux. The resulting colorless reaction mixture was then distilled to a pot temperature of 80° C., placed under water-pump vacuum and concentrated first to a pot temperature of 85° C., and finally to 145° C./0.2 mm. There was thus obtained as residue 93.5 g. of the substantially pure tris[1-(diethoxyphosphinyl)ethyl] borate $n_D^{25}$ 1.4368, which analyzed as follows:

|  | Found | Calcd. for $C_{18}H_{42}BO_{12}P_3$ |
|---|---|---|
| Percent C | 39.02 | 39.00 |
| Percent H | 7.74 | 7.63 |
| Percent Cl | 0.00 | 0.00 |
| Percent B | 1.86 | 1.95 |
| Percent P | 16.95 | 16.78 |

*Example 19*

To 325 ml. of anhydrous ethyl ether cooled at minus 50° C. to minus 40° C. there was added 61.7 g. (0.526 mole) of boron trichloride. The mixture was allowed to warm to 10° C., at which point all of the complex which had formed went into solution. This solution was added, dropwise during 15 minutes, at a temperature of 13–17° C. to a mixture consisting of 262.2 g. (1.58 mole) of triethyl phosphite and 91.9 g. (1.58 mole) of propionaldehyde. The whole was then heated to reflux (35° C.) and distilled to a temperature of 60° C. The residue was placed under water-pump vacuum, heated to 70° C. to remove the last of the by-product and solvent, and then finally concentrated to 95° C./1.5 mm. to give as residue 315 g. of the substantially pure tris[1-(diethoxyphosphinyl)propyl]borate which analyzed as follows:

|  | Found | Calcd. for $C_{21}H_{48}BO_{12}P_3$ |
|---|---|---|
| Percent C | 42.02 | 42.28 |
| Percent H | 7.83 | 8.11 |
| Percent B | 1.90 | 1.81 |
| Percent P | 15.43 | 15.56 |

*Example 20*

Boron trichloride (117.0 g., 1.0 mole) was dissolved in 550 ml. of anhydrous ether cooled at −15° C. to −25° C. The whole was allowed to warm to 10° C. and then added during 0.75 hour to a mixture of 645 g. (3.1 moles) of triisopropyl phosphite and 203 g. (3.5 moles) of propionaldehyde while maintaining the temperature of the reaction mixture at 16–20° C. by cooling. When cooling was discontinued, the temperature increased spontaneously to reflux (36° C.). When there was no further evidence of reaction, the mixture was distilled to a pot temperature of 80° C., placed under water-pump vacuum and warmed to 75° C., and finally concentrated to a pot temperature of 108° C./1.5 mm. to give as residue 720.5 g. of the substantially pure tris[1-

(diisopropoxyphosphinyl)propyl] borate, $n^{25}_D$ 1.4347, which analyzed 1.47% boron and 13.60% phosphorus as against 1.59% and 13.68%, the respective calculated values.

*Example 21*

Boron trichloride (39.3 g., 0.335 mole) was absorbed in about 150 ml. of anhydrous ethyl ether while ice-cooling. Because some ethyl ether-boron trichloride complex separated out, additional ether was added to completely dissolve it. The resulting colorless solution was added, during 0.3 hour, to a solution (284 g.) of tris(2-chloroethyl) phosphite in 59 g. (1.34 mole) of acetaldehyde while maintaining the temperature of the reaction mixture at 16-20° C. by means of ice-cooling. The whole was then gradually warmed to 80° C., placed under vacuum and concentrated to 96° C./2 mm. to obtain as residue 288 g. of the substantially pure tris{1-[bis-(2-chloroethoxy)phosphinyl]ethyl} borate.

*Example 22*

Boron trichloride (117.2 g., 1.0 mole) was dissolved in 600 ml. of anhydrous ether cooled at −30° C. to −50° C. Propylene oxide (58 g., 1.0 mole) was then added at a temperature of −50° C. to −70° C. during a time of 0.5 hour and the whole subsequently allowed to attain a temperature of 10° C. This solution was then added, during 0.5 hour, to a solution of 145 g. (2.5 moles) of propionaldehyde in 703 g. (2.1 moles) of trihexyl phosphite with cooling at 20-28° C. Ether was removed from the reaction mixture by distillation to a pot temperature of 60° C., and distillation was continued under reduced pressure to remove material boiling below 132° C./0.05 mm. to give as residue 733.5 g. of the substantially pure 2-chloropropyl bis[1-(di-n-hexyloxyphosphinyl)propyl]borate, which analyzed 1.30% boron and 8.67% phosphorus as against 1.50% and 8.63%, the respective calculated values.

*Example 23*

Boron trichloride (203 g., 1.73 moles) was dissolved in 1-liter of anhydrous ether contained in a 2-liter flask during 0.75 hour while employing Dry-Ice cooling to maintain the temperature at −10° C. to −25° C. Propylene oxide (201 g., 3.46 moles) was then added during 0.75 hour at −15° C. to −40° C. The resulting solution was allowed to warm to 10° C. and then added during 0.5 hour with cooling to a solution of 380 g. (1.83 moles) of triisopropyl phosphite and 144 g. (2.0 moles) of isobutyraldehyde at a temperature of 16-18° C. When the cooling bath was removed, the resulting mixture warmed spontaneously at reflux (39° C.) for 0.3 hour. The ether was then removed by distillation to 60° C., and the remaining colorless solution was concentrated to 125° C./0.2 mm. to give 768.3 g. of the substantially pure bis(2-chloropropyl) 1-(diisopropoxyphosphinyl)-2-methylpropyl borate, $n^{25}_D$ 1.4383, which analyzed 7.36% phosphorus as against 7.13%, the calculated value.

*Example 24*

Boron tribromide (75 g., 0.3 mole) was added to stirred, anhydrous ether cooled in a Dry-Ice bath at −5° C. to −15° C. during a time of 0.2 hour. To the resulting etherate there was then added 34.8 g. (0.6 mole) of propylene oxide during 0.3 hour at −15° C. to −25° C. When the colorless reaction mixture attained room temperature, it was added during 0.3 hour to a stirred solution of 49.8 g. (0.3 mole) of triethyl phosphite and 20.3 g. (0.35 mole) of propionaldehyde at a temperature of 25-30° C. with occasional cooling. The whole was then warmed at reflux for 0.5 hour, concentrated first to 65° C. under water-pump pressure and then to 103° C./0.2 mm. to give as residue 127 g. of the substantially pure bis(2-bromopropyl) 1-(diethoxyphosphinyl-propyl borate, which analyzed as follows:

|  | Found | Calcd. for $C_{13}H_{28}BBr_2O_6P$ |
| --- | --- | --- |
| Percent C | 31.82 | 32.4 |
| Percent H | 5.89 | 5.9 |
| Percent B | 2.30 | 2.25 |
| Percent P | 5.56 | 6.45 |

*Example 25*

Anhydrous ether (500 ml.) was placed in a 1-liter flask and stirred and cooled as 188.0 g. (1.60 moles) of boron trichloride was added during 1.25 hour at a temperature of −10° C. to −20° C. The resulting slurry was cooled further in Dry Ice as 186 g. (3.20 moles) of propylene oxide was added during a time of 0.75 hour, two-thirds of the oxide being added at −15° C. to −25° C. and the last one-third at −30° C. to −40° C. The resulting mixture was allowed to attain room temperature and was then added during a time of 0.75 hour to a solution of 453 g. (1.68 moles) of tris(2-chloroethyl) phosphite in 101.5 g. (1.75 moles) of propionaldehyde while maintaining the temperature of the mixture at 11-15° C. The whole was then concentrated to 85° C./4 mm. to give 830 g. of the substantially pure bis(2-chloropropyl) 1-[bis(2-chloroethoxy)phosphinyl]propyl borate.

*Example 26*

To a mixture consisting of 16.6 g. (0.10 mole) of triethyl phosphite and 6.8 g. (0.10 mole plus 1 g. excess) of propionaldehyde, cooled to 5° C., there was added, dropwise during 0.15 hour, 19.6 g. (0.10 mole) of n-butoxychlorophenylborane while maintaining the temperature of the reaction mixture at 10-20° C. by means of an ice bath. The whole was then heated to 60° C. to insure complete reaction, subjected to water-pump vacuum and heated to 90° C. to remove the by-product, and finally concentrated to 100° C./0.05 mm. to obtain as residue 35 g. (98.4% theoretical yield) of the substantially pure n-butyl 1-(diethoxyphosphinyl) propyl benzeneboronate, $n_D^{25}$ 1.4780.

*Example 27*

To a mixture consisting of 8.3 g. (0.095 mole) of diethyl ketone and 15.9 g. (0.095 mole) of triethyl phosphite there was added, dropwise with stirring during 5 minutes, 19.1 g. (0.095 mole) of chlorodiphenylborane while maintaining the temperature of the reaction mixture at 10-15° C. by means of an ice bath. The whole was heated to 58° C. to insure complete reaction, placed under water-pump vacuum and heated to 60° C. to remove by-product ethyl chloride and finally concentrated to 90° C./0.9 mm. to give as residue 35 g. (95% theoretical yield) of the substantially pure 3-diethoxyphosphinyl-3-pentyl diphenylborinate, $n_D^{25}$ 1.5458.

*Example 28*

Dichlorophenylborane (19 g., 0.12 mole) was added, dropwise during 0.33 hour, to a mixture consisting of 29.8 g. (0.24 mole) of trimethyl phosphite and 15 g. (0.24 mole plus 1 g. excess) of propionaldehyde while maintaining the temperature at 13-19° C. The whole was then heated to 60° C., subjected to water-pump vacuum and heated to 77° C. to remove by-product and finally concentrated to 90° C./0.1 mm. to give as residue 49.5 g. (97.7% theoretical yield) of the substantially pure bis[1-(diethoxyphosphinyl)propyl]benzeneboronate, $n_D^{25}$ 1.4870.

*Example 29*

To a mixture consisting of 14.6 g. (0.106 mole) of p-anisaldehyde and 17.7 g. (0.106 mole) of triethyl phosphite there was added, dropwise during 5 minutes, 21.4 g. (0.106 mole) of chlorodiphenylborane while maintaining the temperature of the reaction mixture at 12-20° C. by means of an ice-bath. The whole was heated to 50° C.

to insure complete reaction and then heated to 60° C. under water-pump vacuum to remove by-product ethyl chloride. Concentration of the remainder to 90° C./2.0 mm. gave as residue 46.5 g. (95% theoretical yield) of the substantially pure α-diethoxyphosphinyl-4-methoxy-benzyl diphenylborinate, $n_D^{25}$ 1.5581.

*Example 30*

Di-n-butoxychloroborane was prepared by adding, dropwise during 0.4 hour, 50.7 g. (0.22 mole) of tri-n-butyl borate to a solution of 13.5 g. (0.11 mole) of boron trichloride in 75 ml. of methylene dichloride at a temperature of −65° C. to −70° C. and allowing the resulting reaction mixture to attain 0° C. The resulting solution of the di-n-butoxychloroborane was then added, dropwise during 0.5 hour, to a mixture consisting of 138.9 g. of tris(2-ethylhexyl) phosphite, 25 ml. of methylene dichloride and 35.2 g. (0.33 mole) of benzaldehyde at a temperature which was maintained at 4–10° C. by an ice-salt bath. The whole was allowed to warm to room temperature and then heated to 70° C./2.0 mm. to remove solvent and by-product. Concentration to 142° C./2.0 mm. gave as residue 184 g. (98% theoretical yield) of the substantially pure dibutyl α-[bis(2-ethylhexyloxy)phosphinyl]benzyl borate, $n_D^{25}$ 1.4635.

*Example 31*

A methylene dichloride solution of dichloro-n-decyloxyborane was prepared as follows: A 500 ml. flask equipped with thermometer, stirrer, Dry-Ice condenser protected with a drying tube and a dropping funnel was charged with 75 ml. of methylene dichloride, and 34.9 g. (0.298 mole) of boron trichloride was condensed in the flask which was immersed in a Dry-Ice bath. There was then added thereto 47.1 g. of n-decyl alcohol during 25 minutes at −70° C. to −80° C. When all of the chloride had been added, the reaction mixture was gradually allowed to reach 0° C., at which point the reaction mixture was placed under water-pump vacuum to remove hydrogen chloride. The residue was a solution of the dichloro-n-decyloxyborane in methylene dichloride. This was added, dropwise during 25 minutes, to a cooled mixture consisting of 98.5 g. (0.596 mole) of triethyl phosphite and 38 g. (0.655 mole) of propionaldehyde at a temperature of 10–22° C. Upon discontinuing the cooling, the temperature of the reaction mixture increased spontaneously to 40° C., and it was maintained at this temperature for 5 minutes to insure complete reaction. It was then subjected to water-pump vacuum and heated to 50° C. to remove solvent and by-product ethyl chloride. Concentration to 120° C./0.9 mm. gave as residue 161.7 g. (97.6% theoretical yield) of the substantially pure decyl bis[1-(diethoxyphosphinyl)propyl]borate, $n_D^{25}$ 1.4373, which analyzed as follows:

|  | Found | Calcd. for $C_{24}H_{53}O_9BP_2$ |
| --- | --- | --- |
| Percent C | 50.65 | 51.66 |
| Percent H | 9.64 | 9.56 |
| Percent P | 10.74 | 11.09 |
| Percent B | 1.89 | 1.94 |

*Example 32*

Tri-n-butyl borate (52.4 g., 0.22 mole) was added, dropwise during one hour, to 13.4 g. (0.11 mole) of boron trichloride at a temperature of −70° C. to −80° C. Cooling was then discontinued, the mixture allowed to warm to 5° C., and 175 ml. of anhydrous ethyl ether was added to dissolve the product. The resulting solution constituted an ether solution of chlorodi-n-butoxyborane. It was added, dropwise, to a mixture consisting of 57 g. (0.34 mole) of triethyl phosphite and 19.8 g. (0.34 mole) of propionaldehyde which had been cooled to 0° C. During the addition, the temperature of the reaction mixture was maintained at 5–11° C. The whole was then warmed to 35° C., subjected to water-pump vacuum and warmed to remove the ether solvent and the by-product ethyl chloride. Concentration of the residue to 62° C./1.5 mm. gave 122.8 g. (100% theoretical yield) of the substantially pure dibutyl 1-(diethoxyphosphinyl)propyl borate, $n_D^{25}$ 1.4219, which analyzed 8.21% phosphorus and 3.14% boron as against 8.79% and 3.08%, the calculated values.

*Example 33*

A solution of 1.48 mole of diallyloxychloroborane in an equal volume of methylene dichloride was cooled in Dry Ice as 1.48 mole of chloral was added thereto during a time of 0.5 hour. The resulting mixture was then allowed to warm to 20° C. and 190 g. (1.53 mole) of trimethyl phosphite was added during 0.6 hour with cooling to maintain the temperature of the reaction mixture at 15–30° C. The whole was then distilled to a pot temperature of 80° C. and the residue concentrated to 100° C./0.2 mm. to give as residue 471.5 g. of the substantially pure diallyl 1 - (dimethoxyphosphinyl) - 2 - trichloroethyl borate, $n_D^{25}$ 1.4782.

*Example 34*

To a cooled (2° C.) mixture consisting of 21.8 g. (0.11 mole) of diethyl phenylphosphonite and 6.4 g. (0.11 mole) of propionaldehyde there was added, dropwise during 10 minutes, a solution consisting of 17.7 g. (0.11 mole) of chlorodiallyloxyborane in 17.7 g. of methylene chloride. During addition of the boron compound the temperature of the reaction mixture was maintained at 10–13° C. by means of an ice-bath. The whole was then heated to reflux (55° C.) to insure complete reaction, placed under water-pump vacuum and heated to 60° C. to remove the solvent and any by-product. Concentration to 90° C./0.1 mm. gave as residue 34.5 g. of the substantially pure diallyl 1-(ethoxyphenylphosphinyl)-propyl borate.

*Example 35*

To a cooled mixture consisting of 5.4 g. (0.025 mole) of methyl diphenylphosphinite and 2.9 g. (0.050 mole) of propionaldehyde there was gradually added a solution of 4.0 g. (0.025 mole) of diallyloxychloroborane in an equal volume of methylene dichloride while employing ice-cooling. When all of the boron compound had been added, cooling was discontinued and the temperature of the reaction mixture was allowed to increase spontaneously to 40° C. The reaction mixture was then concentrated to a pot temperature of 80° C./0.1 mm. to give as residue 8.2 g. of the substantially pure diallyl 1-(diphenylphosphinyl)propyl borate, $n_D^{25}$ 1.5680.

*Example 36*

To a cooled mixture consisting of 33.2 g. (0.2 mole) of triethyl phosphite and 11.6 g. (0.2 mole) of propionaldehyde there was added, dropwise during 0.3 hour, 31.7 g. (0.14 mole) of bis(butylthio)chloroborane, using an ice-bath to maintain the temperature of the reaction mixture at 5–11° C. When all of the borane compound had been added the mixture was warmed to 30° C. and then concentrated to 90° C./0.1 mm. to give 48.9 g. (90% theoretical yield) of the substantially pure S,S-dibutyl 1-(diethoxyphosphinyl) propyl dithioborate, analyzing 2.93% B as against 2.82% for the calculated value.

*Example 37*

To a mixture consisting of 34.9 g. (0.6 mole) of propionaldehyde and 74.5 g. (0.6 mole) of trimethyl phosphite there was gradually added 59.5 g. of dibromo(ethylthio)borane at a temperature of 0° C. to minus 20° C. The whole was stirred until there was no evidence of reaction, filtered, and the filtrate placed under water-pump vacuum and heated to 50° C. to remove by-product and excess reactants. Concentration to 98° C./0.6 mm.

gave as residue the substantially pure S-ethyl bis[1-(diethoxyphosphinyl)propyl] thioborate.

*Example 38*

To a cooled (5° C.) mixture consisting of 16.0 g. (0.127 mole) of 4-cyano-2,2-dimethylbutyraldehyde and 21.2 g. (0.127 mole) of triethyl phosphite there was added, dropwise during 0.15 hour, 28.6 g. (0.127 mole) of bis(butylthio)chloroborane. An ice-bath was used during addition of the boron compound to maintain the temperature of the reaction mixture at 10–15° C. When all of the boron compound had been added, the mixture was stirred until no further reaction was evident. It was then heated to 50° C. to insure complete reaction, placed under water-pump vacuum, and heated to 75° C. to remove any by-product. There was thus obtained as residue the substantially pure S,S-dibutyl 1-(diethoxyphosphinyl)-2-dimethyl-4-cyanobutyl dithioborate.

*Example 39*

To a mixture consisting of 13.3 g. (0.08 mole) of triethyl phosphite and 5.0 g. (0.086 mole) of propionaldehyde there was added, with stirring, a solution of 4.8 g. (0.038 mole) of dichlorodimethylaminoborane in 30 ml. of toluene during a time of 0.2 hour at a temperature of 5–12° C. The whole was then warmed to 90° C. and subsequently concentrated to a pot temperature of 95° C./0.05 mm. to give as residue 15.2 g. (89% theoretical yield) of the substantially pure bis[1-(diethoxyphosphinyl)propxy]dimethylaminoborane, $n_D^{25}$ 1.4514, which analyzed as follows:

|  | Found | Calcd. for $C_{16}H_{38}BNO_8P_2$ |
| --- | --- | --- |
| Percent B | 2.24 | 2.43 |
| Percent Cl | 0.00 | 0.00 |
| Percent N | 2.78 | 3.15 |
| Percent P | 13.62 | 13.9 |

*Example 40*

A solution consisting of 28.0 g. (0.108 mole) of bromodipiperidinoborane in an equal volume of benzene was added to a mixture consisting of 19.9 g. (0.12 mole) of triethyl phosphite and 8.7 g. (0.15 mole) of acetone, during 0.2 hour, while maintaining the temperature of the reaction mixture at 38° C. by means of ice-cooling. The whole was then warmed to 45° C., filtered and the filtrate concentrated to 92° C./0.05 mm. to give as residue 40 g. of the substantially pure dipiperidino-2-[(diethoxyphosphinyl)propoxy]borane, $n_D^{25}$ 1.4926.

*Example 41*

This example describes testing of some of the presently provided compounds for use as preignition-inhibiting agents in leaded fuels. It has been established that there is a close relationship between the quantity of a material required to suppress glow and the effectiveness of the same material for reducing preignition of a leaded fuel in gasoline engines; accordingly, testing of the present compounds was conducted by a glow test method wherein the following procedure was employed:

Test blends were prepared by blending (1) 5 ml. of a fuel consisting of a high-boiling (380–420° F.) hydrocarbon fraction containing approximately 130 mg. of lead based on the quantity of a commercial tetraethyllead-halohydrocarbon additive (hereinafter referred to as TEL) which had been incorporated therein and 1 ml. of an SAE 30 grade lubricating oil with (2) graduated, precisely weighed quantities of one of the phosphinyl boron compounds to be tested, said quantities being in the range of 0.01 to 2.0 times the quantity of lead present. Two ml. of the test blend was then dropped at a constant rate (1.5±0.1 ml./15 minutes), during a 15–17 minute period, onto a reagent grade decolorizing carbon contained in a crucible maintained in a furnace at a temperature which was high enough to keep the bottom of the crucible at ca. 1,000° F. By using test blends containing progressively lower quantities of the test compound, there was determined the minimum concentration of the test compound at which no glowing of the carbon was evidenced either during the dropping period or after all of the test sample had been added. Under these conditions, a "control" sample, i.e., one which contained all of the constituents of the test blend except the boron compound, caused the carbon to glow throughout addition thereof and after addition had been completed. On the other hand, no glowing was observed when there was present in the test blend the minimum concentration shown below of one of the following phosphinyl boron compounds per 5 ml. of said fuel (A):

0.0400 g. of tris[1-(diethoxyphosphinyl)ethyl] borate (Example 18)

0.0853 g. of bis(2-bromopropyl) 1-(diethoxyphosphinyl)propyl borate (Example 24)

0.0990 g. of dibutyl 1-(diethoxyphosphinyl)propyl borate (Example 32)

0.0553 g. of 2-[1-(diethoxyphosphinyl)propoxy]-5,5-dimethyl-1,3,2-dioxaborinane (Example 2)

0.0697 g. of tris[1-(diisopropoxyphosphinyl)propyl] borate (Example 20)

0.0624 g. of 2-chloropropyl bis[1-(di-n-hexyloxy-phosphinyl)propyl] borate (Example 22)

Instead of the phosphinyl boron compounds shown above, there may be used, for the purpose of effectively inhibiting preignition of leaded fuels, any of the gasoline-soluble compounds provided by the present invention, the data on the above compounds being supplied merely by way of illustrating the valuable properties of those of the compounds of the series which are prepared from relatively readily available raw materials. While, as will be obvious to those skilled in the art, the compound to be useful must be present in the gasoline in soluble form, it will also be realized that since the additive is employed in only very low concentrations, gasoline solubility at the useful concentrations is possessed by the great preponderance of the presently prepared compounds. Whether the phosphinyl boron compound is soluble in the gasoline at a concentration which is within the range of, say, from 0.01 to 2.0 volume per volume of organolead compound present in the gasoline can be readily ascertained by routine experimentation.

Inasmuch as the crude reaction mixture obtained by the present process comprises an aliphatic halohydrocarbon as by-product, the latter obviously can serve conveniently as the lead scavenger in leaded gasoline fuels containing the presently prepared boron-phosphorus compounds.

Leaded gasolines containing the presently prepared compounds are compatible with other additives customarily used in the art, e.g., rust-inhibitors, stabilizers or antioxidants, dyes, etc. Obviously, many variations can be made without departing from the spirit of the invention.

What we claim is:

1. A compound of the formula

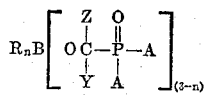

wherein R is selected from the class consisting of alkyl, alkenyl, aryl, alkaryl, and aralkyl radicals of from 1 to 12 carbon atoms and such radicals linked at a carbon atom thereof to the boron through an element selected from the class consisting of oxygen and sulfur; (alkyl)$_2$N- radicals having from 1 to 5 carbon atoms in each alkyl group;

radicals wherein D represents the necessary atoms to complete a saturated N-hetero ring of from 2 to 5 carbon atoms; and wherein two R's taken together stand for a bivalent —O-alkylene-O— radical having from 2 to 4 carbon atoms in the alkylene chain and a total of from 2 to 12 carbon atoms; $n$ is an integer of 0 to 2; Y is selected from the class consisting of hydrogen and alkyl radicals of from 1 to 12 carbon atoms when $n$ is zero, and when $n$ is 1 to 2, Y is selected from the class consisting of hydrogen and the radicals: alkyl of from 1 to 12 carbon atoms, furyl, thienyl and benzenoid hydrocarbon which are free of aliphatic unsaturation and contain from 6 to 12 carbon atoms; and said radicals carrying a substituent selected from the class consisting of halogen, cyano, alkyl, —O-alkyl and —COOalkyl where the alkyl radical has from 1 to 5 carbon atoms; Z is selected from the class consisting of hydrogen and alkyl radicals of from 1 to 3 carbon atoms and is alkyl only when $n$ is from 1 to 2 and Z and Y taken together complete a cycloalkane ring having from 5 to 6 carbon atoms in the ring and a total of from 5 to 10 carbon atoms; and each A is selected from the class consisting of alkoxy, haloalkoxy, alkyl, aryl, aralkyl and alkaryl radicals of from 1 to 12 carbon atoms.

2. A compound of the formula $$R'-B\begin{matrix} O-CH-P-(O-alk)_2 \\ | \quad || \\ Y \quad O \\ \\ O-CH-P-(O-alk)_2 \\ | \quad || \\ Y \quad O \end{matrix}$$

in which R′ is a hydrocarbon radical of from 1 to 12 carbon atoms and alk and Y are alkyl radicals of from 1 to 12 carbon atoms.

3. A compound of the formula $$\begin{matrix} \text{alk} \quad O \\ | \quad || \\ B-O-CH-P(O\text{ alk})_2 \\ \diagdown \quad \diagup \\ O-\text{alkylene}-O \end{matrix}$$

in which alkylene denotes a bivalent alkylene radical having from 2 to 4 carbon atoms in the alkylene chain and a total of from 2 to 12 carbon atoms and alk denotes an alkyl radical of from 1 to 12 carbon atoms.

4. 2 - [1-(diethoxyphosphinyl)propoxy]-5,5-dimethyl-1,3,2-dioxaborinane.

5. Tris[1-(diethoxyphosphinyl)ethyl]borate.

6. Tris[1-(diisopropoxyphosphinyl)propyl]borate.

7. 2 - chloropropyl bis[1-(di-n-hexyloxyphosphinyl)-propyl]borate.

8. n-Butyl 1-(diethoxyphosphinyl)propyl benzeneboronate.

9. The method which comprises contacting a boron compound of the formula $$R_nBX_{(3-n)}$$

where $n$ is an integer of 0 to 2, X is selected from the class consisting of chlorine and bromine, R is selected from the class consisting of alkyl, alkenyl, aryl, alkaryl, and aralkyl radicals of from 1 to 12 carbon atoms and such radicals linked at a carbon atom thereof to the boron through an element selected from the class consisting of oxygen and sulfur; (alkyl)$_2$N- radicals having from 1 to 5 carbon atoms in each alkyl group;

$$D\underbrace{\quad}_{\phantom{x}}N-$$

radicals wherein D represents the necessary atoms to complete a saturated N-hetero ring of from 2 to 5 carbon atoms; and wherein two R's taken together stand for a bivalent —O-alkylene-O— radical having from 2 to 4 carbon atoms in the alkylene chain and a total of from 2 to 12 carbon atoms, with a carbonyl compound of the formula $$\begin{matrix} Z \\ | \\ C=O \\ | \\ Y \end{matrix}$$

wherein Y is selected from the class consisting of hydrogen and alkyl radicals of from 1 to 12 carbon atoms when $n$ is zero in the boron compound, and when $n$ is 1 to 2 in the boron compound, Y is selected from the class consisting of hydrogen and the radicals: alkyl of from 1 to 12 carbon atoms, furyl, thienyl and benzenoid hydrocarbons which are free of aliphatic unsaturation and contain from 6 to 12 carbon atoms; and said radicals carrying a substituent selected from the class consisting of halogen, cyano, alkyl, —O-alkyl and —COOalkyl where the alkyl radical has from 1 to 5 carbon atoms; and a trivalent phosphorus ester of the formula $$\begin{matrix} A \\ | \\ A-P-OT \end{matrix}$$

in which T is selected from the class consisting of alkyl and haloalkyl radicals of from 1 to 12 carbon atoms and each A is selected from the class consisting of —OT and alkyl, aryl, aralkyl and alkaryl radicals of from 1 to 12 carbon atoms; and, recovering from the resulting reaction product a phosphinyl boron compound of the formula $$R_nB\begin{bmatrix} Z \quad O \\ | \quad || \\ OC-P-A \\ | \quad | \\ Y \quad A \end{bmatrix}_{(3-n)}$$

in which R, Z, Y, A and $n$ are as herein defined.

10. The method which comprises contacting an alkoxy dichloroborane having from 1 to 12 carbon atoms in the alkoxy radical with an alkanecarboxaldehyde having from 1 to 12 carbon atoms in the alkane radical and a trialkyl phosphite having from 1 to 12 carbon atoms in the alkyl radical and recovering from the resulting reaction product a bis[1-(dialkoxyphosphonyl)alkyl] alkyl borate having from 1 to 12 carbon atoms in each of the alkoxy and alkyl radicals.

11. The method which comprises contacting a halogenated ring compound of boron having the formula $$\begin{matrix} B-Cl \\ \diagup \quad \diagdown \\ O-\text{alkylene}-O \end{matrix}$$

where the alkylene group has from 2 to 4 carbon atoms in the alkylene chain and a total of from 2 to 12 carbon atoms with an alkanecarboxaldehyde having from 1 to 12 carbon atoms in the alkyl radical and a trialkyl phosphite having from 1 to 12 carbon atoms in the alkyl radical and recovering from the resulting reaction product a phosphinyl boron compound of the formula $$\begin{matrix} \text{alk} \quad O \\ | \quad || \\ B-O-CH-P(O\text{-alk})_2 \\ \diagdown \quad \diagup \\ O-\text{alkylene}-O \end{matrix}$$

in which alkylene is as herein defined and alk denotes an alkyl radical of from 1 to 12 carbon atoms.

12. The method which comprises mixing together triethyl phosphite, propionaldehyde and 5,5-dimethyl-2-chloro-1,3,2-dioxaborinane and recovering 2-[1-(diethoxyphosphinyl)propoxy] - 5,5-dimethyl-1,3,2-dioxaborinane from the resulting reaction product.

13. The method which comprises mixing together triethyl phosphite, acetaldehyde and boron trichloride etherate and recovering tris[1-(diethoxyphosphinyl)ethyl]borate from the resulting reaction product.

14. The method which comprises mixing together triisopropyl phosphite, propionaldehyde and boron trichloride etherate and recovering tris[1-(diisopropoxyphosphinyl)propyl]borate from the resulting reaction product.

15. A compound of the formula $$B\begin{bmatrix} O \\ || \\ OCH-P-(O-alk)_2 \\ | \\ Y \end{bmatrix}_3$$

where Y and alk denote an alkyl radical of from 1 to 12 carbon atoms.

16. The method which comprises contacting a boron compound of the formula $$R_nBX_{(3-n)}$$

where $n$ is an integer of 0 to 2, X is selected from the class consisting of chlorine and bromine and R is selected from the class consisting of alkyl, alkenyl, aryl, alkaryl and aralkyl radicals of from 1 to 12 carbon atoms and such radicals linked at a carbon atom thereof to the boron through an element selected from the class consisting of oxygen and sulfur, with a hydroxy phosphonate of the formula $$HO\underset{Y}{\overset{Z}{C}}-P(OT)_2$$

wherein Y is selected from the class consisting of hydrogen and the radicals: alkyl and benzenoid hydrocarbon of from 1 to 12 carbon atoms, furyl and thienyl and said radicals carrying a substituent selected from the class consisting of halogen, cyano, alkyl, —O-alkyl and —COO-alkyl where the alkyl radical has from 1 to 5 carbon atoms; Z is selected from the class consisting of hydrogen and alkyl radicals of from 1 to 3 carbon atoms; and T is selected from the class consisting of alkyl and haloalkyl radicals of from 1 to 12 carbon atoms and recovering from the resulting reaction product a phosphinyl boron compound of the formula $$R_nB\left[O\underset{Y}{\overset{Z}{C}}-\overset{O}{\overset{\|}{P}}(OT)_2\right]_{(3-n)}$$

wherein R, Z, Y, T and $n$ are as above defined.

17. The method which comprises contacting a boron compound of the formula $$Alkyl-O-BCl_2$$

wherein the alkyl radical has from 1 to 12 carbon atoms with a hydroxy-alkanephosphonate of the formula $$HO\underset{alkyl}{\overset{}{C}}H-\overset{O}{\overset{\|}{P}}(OAlkyl)_2$$

wherein each alkyl radical has from 1 to 12 carbon atoms and recovering from the resulting reaction product a compound of the formula $$alkyl-O-B\left[O\underset{alkyl}{\overset{}{C}}H-\overset{O}{\overset{\|}{P}}(OAlkyl)_2\right]_2$$

wherein each alkyl radical has from 1 to 12 carbon atoms.

18. The method which comprises contacting diethyl 1-hydroxy-propylphosphonate with 2-chloro-5,5-dimethyl-1,3,2-dioxaborinane and recovering 2-[1-(diethoxyphosphinyl)propoxy]-5,5-dimethyl-1,3,2-dioxaborinane from the resulting reaction product.

References Cited in the file of this patent

UNITED STATES PATENTS

| | | |
|---|---|---|
| 2,848,475 | Schmidt | Aug. 19, 1958 |
| 2,870,190 | Burger et al. | Jan. 20, 1959 |
| 2,892,691 | Howell | June 30, 1959 |
| 2,897,071 | Gilbert | July 28, 1959 |

UNITED STATES PATENT OFFICE
CERTIFICATE OF CORRECTION

Patent No. 3,014,952                          December 26, 1961

Gail H. Birum et al.

It is hereby certified that error appears in the above numbered patent requiring correction and that the said Letters Patent should read as corrected below.

Column 20, line 24, for "phenylborne" read -- phenylborane --; column 25, line 61, for "daryloxy-chloroborane" read -- diaryloxy-chloroborane --; line 68, for "halogated" read -- halogenated --; column 26, lines 56 to 59, the formula should appear as shown below instead of as in the patent:

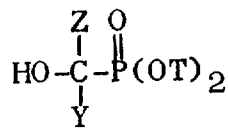

column 28, second table, heading to the third column, for "$C_{13}H_{26}O_6BP$" read -- $C_{12}H_{26}O_6BP$ --; same column 28, line 67, for "C./0.0.5-0.1 mm." read -- C./0.05-0.1 mm. --; column 37, line 30, for "yl)propxy]" read -- yl)propoxy] --; column 40, line 34, for "bis[1-(dialkoxyphosphonyl)" read -- bis[1-(dialkoxyphosphinyl) --.

Signed and sealed this 4th day of December 1962.

(SEAL)
Attest:

ERNEST W. SWIDER
Attesting Officer

DAVID L. LADD
Commissioner of Patents